(12) United States Patent
Salomonsson

(10) Patent No.: US 10,260,913 B2
(45) Date of Patent: Apr. 16, 2019

(54) SENSOR AND METHOD ENABLING THE DETERMINATION OF THE POSITION AND ORIENTATION OF A FLEXIBLE ELEMENT

(71) Applicant: FEATHERWAY ROBOTICS AB, Uppsala (SE)

(72) Inventor: Niklas Salomonsson, Uppsala (SE)

(73) Assignee: FEATHERWAY ROBOTICS AB, Uppsala (SE)

( * ) Notice: Subject to any disclaimer, the term of this patent is extended or adjusted under 35 U.S.C. 154(b) by 80 days.

(21) Appl. No.: 15/545,564

(22) PCT Filed: Jan. 22, 2016

(86) PCT No.: PCT/SE2016/050040
§ 371 (c)(1),
(2) Date: Jul. 21, 2017

(87) PCT Pub. No.: WO2016/118070
PCT Pub. Date: Jul. 28, 2016

(65) Prior Publication Data
US 2017/0350733 A1    Dec. 7, 2017

(30) Foreign Application Priority Data
Jan. 22, 2015   (SE) ...................................... 1550059

(51) Int. Cl.
*G01B 11/16* (2006.01)
*G01D 5/353* (2006.01)
(Continued)

(52) U.S. Cl.
CPC ............. *G01D 5/353* (2013.01); *G01B 11/16* (2013.01); *G01B 11/255* (2013.01); *G01D 5/34* (2013.01); *G01D 5/35345* (2013.01)

(58) Field of Classification Search
CPC ..... G01B 11/16; G01B 11/255; G01L 11/025; G01L 1/242; G01D 5/353; G01D 11/245; G01D 5/34; G02B 6/3536; G02B 6/3628
(Continued)

(56) References Cited

U.S. PATENT DOCUMENTS

| 4,542,291 A | 9/1985 | Zimmerman |
|---|---|---|
| 4,727,247 A | 2/1988 | Johnston |

(Continued)

FOREIGN PATENT DOCUMENTS

| DE | 40 02 293 A1 | 8/1991 |
|---|---|---|
| DE | 10 2006 048 635 A1 | 4/2008 |

(Continued)

OTHER PUBLICATIONS

Extended European Search Report for Application No. 1674047, dated Jun. 13, 2018.
(Continued)

*Primary Examiner* — Que Tan Le
(74) *Attorney, Agent, or Firm* — Young & Thompson

(57) ABSTRACT

Disclosed is a sensor enabling positioning of a flexible element subject to applied forces. The sensor includes at least two spatially separated light permeable tubes, each having first and second ends arranged on respective first and second frame portions of the flexible element. At least one of the first or second ends of at least one light permeable tube are attached to a corresponding first frame portion by a joining unit. Each of the at least two spatially separated light permeable tubes includes at least one light detecting device, connectable to a processing unit, and arranged at a light detecting position of a corresponding light permeable tube to detect light from at least one light emitting device through the corresponding light permeable tube and transferring information including information relating to the detected
(Continued)

light to the processing unit, enabling the processing unit to determine the bend of the light permeable tubes.

20 Claims, 15 Drawing Sheets

(51) Int. Cl.
*G01B 11/255* (2006.01)
*G01D 5/34* (2006.01)

(58) Field of Classification Search
USPC ................................................. 250/227.14
See application file for complete search history.

(56) References Cited

U.S. PATENT DOCUMENTS

| | | | |
|---|---|---|---|
| 5,026,141 | A | 6/1991 | Griffiths |
| 5,633,494 | A | 5/1997 | Danisch |
| 5,818,982 | A | 10/1998 | Voss et al. |
| 6,389,187 | B1 | 5/2002 | Greenaway et al. |
| 6,471,710 | B1 | 10/2002 | Bucholtz |
| 7,356,238 | B2 * | 4/2008 | Kishida ............... G01D 11/245 250/227.14 |
| 2002/0128783 | A1 | 9/2002 | Marcu et al. |
| 2006/0045408 | A1 | 3/2006 | Jones et al. |
| 2007/0116415 | A1 | 5/2007 | Kobayashi |
| 2007/0156019 | A1 | 7/2007 | Larkin et al. |
| 2011/0292049 | A1 | 12/2011 | Muravsky |
| 2012/0035437 | A1 | 2/2012 | Ferren et al. |
| 2015/0141768 | A1 | 5/2015 | Yu et al. |

FOREIGN PATENT DOCUMENTS

| | | |
|---|---|---|
| EP | 1 635 034 A1 | 3/2006 |
| GB | 2286242 | 8/1995 |
| WO | 94/29671 A1 | 12/1994 |
| WO | 99/13306 | 3/1999 |
| WO | 01/13060 A1 | 2/2001 |
| WO | 2015/016765 A1 | 2/2015 |

OTHER PUBLICATIONS

Markley, "Attitude Determination using Vector Observations and the Singular Value Decomposition", The Journal of the Astronautical Sciences, Jul.-Sep. 1988, pp. 245-258, vol. 36, No. 3.
Xu et al.,"An Investigation of the Intrinsic Force Sensing Capabilities of Continuum Robots", IEEE Transactions on Robotics (TRO), 2007, pp. 576-587, vol. 23, No. 3.
Lobaton et al., "Continuous Shape Estimation of Continuum Robots Using X-ray Images", 2013 IEEE International Conference on Robotics and Automation (ICRA), May 6-10, 2013, pp. 725-732.
Croom et al., "Visual Sensing of Continuum Robot Shape Using Self-Organizing Maps" 2010 IEEE International Conference on Robotics and Automation, May 3-8, 2010, pp. 4591-4596.
Chen et al., "Sensor-based guidance control of a continuum robot for a semi-autonomous colonoscopy", Robotics and Autonomous Systems, 2009, pp. 712-722, vol. 57.
Cruz et al., "Modeling Two Classes of Stewart-Gough Platforms", Proc. ROBOTICA2005 5th Portugese Robotic Festival, 2005, Coimbra, Portugal.
Zawawi et al., "Compensated Intensity-Modulated Optical Fibre Bending Sensor based on Tilt Angle Loss Measurement", IEEE Sensors 2014 Proceedings, Nov. 2, 2014, pp. 370-373.
Kesner et al., "Multifiber optical bend sensor to aid colonoscope navigation", Optical Engineering, Dec. 2011, pp. 124402-1 to 124402-7, vol. 50, No. 12.
Supplemental European Search Report, dated Feb. 22, 2017, from EP application No. 14832200.1.
International Search Report, dated Nov. 28, 2014, from PCT application No. PCT/SE2014/050903.
International Search Report, dated Apr. 8, 2016, from corresponding PCT application No. PCT/SE2016/050040.

* cited by examiner

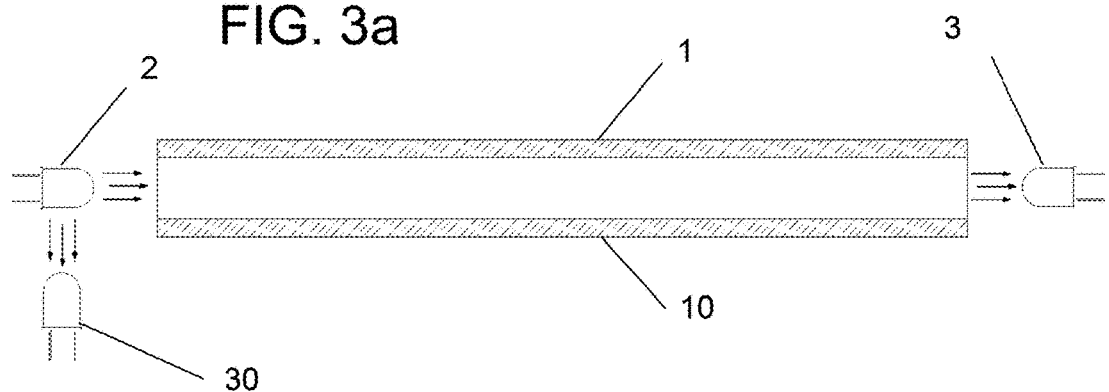
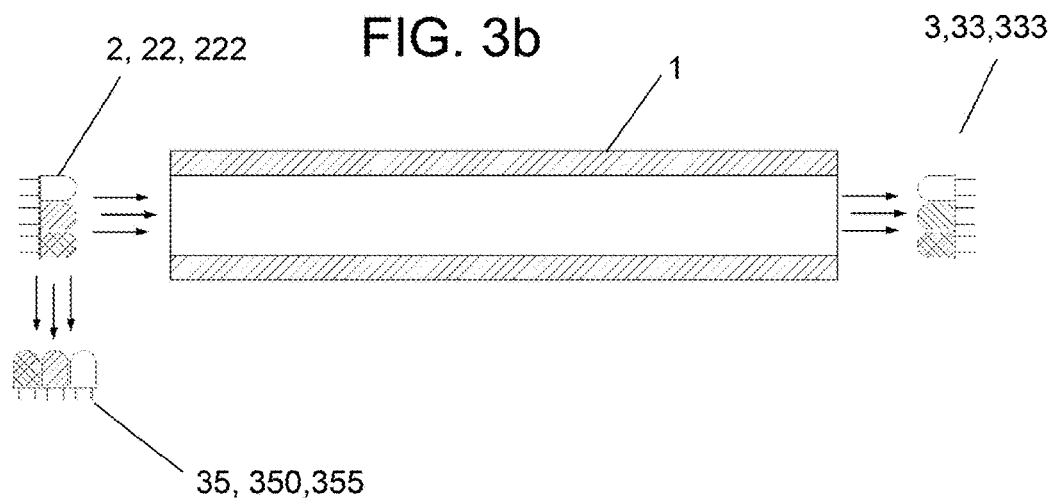

SENSOR AND METHOD ENABLING THE DETERMINATION OF THE POSITION AND ORIENTATION OF A FLEXIBLE ELEMENT

TECHNICAL FIELD

The proposed technology generally relates to a sensor and a method that enables the determination of the position and orientation of a flexible element subject to applied forces and torques.

BACKGROUND

One of the problems in traditional robotics is that the limbs of a robot must be bend resistant so that the position of the end effector can be positioned by summing the vectors from each axis rotation point. To make the limbs bend resistant the most common approach is to manufacture them out of metal. This results in excessively heavy robots that demand a high amount of power during operation. In mobile robotics this renders a relatively low battery time which in turn limits the capabilities of the robot. The weight of the robot limbs can be reduced by introducing more light weighted materials such as carbon fiber, which has a high strength to weight ratio. This on the other hand has the downside that the limbs will be prone to bending. This proposal therefore results in decreased energy demands but also a decrease in precision. Many different methods have been proposed to model robots with bending limbs, also referred to as continuum robots, all resulting in more or less precise 3D positioning results depending on what sensor data is used. Sensors used in continuum robotic limbs make use of force sensors attached to varying parts of the robot (Ref.1). X-Rays and other visual systems have also been used in shape estimation see e.g. (Ref.2) and (Ref.3). Positioning using optical fibers have been proposed where three pairs of optical fibers are attached on the robot. Light is emitted through one of the fibers in each pair. The light is directed out from the robots body towards the surrounding walls. The intensity of the light that bounces back from the walls is measured through the other optical fiber in the pair. By a priori knowledge of the surrounding walls the information from the intensity measurements can be used to make a positioning of the robot see (Ref.4). Such a measurement procedure is however inherently dependent upon the background and will significantly reduce the possible environments where the robot can be successfully used.

The bend of a flexible robotic limb can be determined using bend resistors, where the resistor is fastened on the limbs. Bend resistors exists today in the form of resistive sensors that change the resistance of the device when bent. The resistance is proportional to the bend and can thus be used to estimate the bend of the sensor or the force that is applied to the sensor if other specifications of the sensor are given. One example of this is the Tactilus® Flex by SENSOR PRODUCTS INC. One approach of estimating the bend in a structure element using at least three strain sensors positioned around the structure is disclosed in Ref. 5. The lengthening and shortening of the structure at a specific position where a strain sensor is present can be measured. By using multiple strain sensors the bend of the structure can be estimated. This approach utilizes Bragg-gratings to obtain the estimate.

In Ref 6, there is proposed a sensor for determining the bend of a number of optical fibers bundled together. The optical fibers form part of a colonoscopy camera and are provided with holes on their surface. A measurement of the intensity of light emitted through the optical fibers is compared to an initial intensity level. If the fibers are bent a certain amount of light will escape through the holes and thus leading to a difference in detected intensity contra the emitted intensity. The fact that the optical fibers are bundled together will however negatively affect the precision of the measurements needed to be able to determine the position of a flexible large body subject to substantial forces and torques.

Multi-tubular continuum robotic limbs have been used in robotic applications where weight and material use may be an issue. Generally, the tubes are fastened in solid sectional dividing frames. A multi sectional approach can be used where each sectional divider can be considered a frame. Estimation of the dynamic transformation of each pair of bases is done using modeling in combination with sensor readings and a priori knowledge of external forces. From the dynamic transformation and information about the tubular structure 3D positioning of the end effector and other parts can be made. This proposal however relies upon the a priori knowledge of the applied forces and are therefore somewhat lacking in respect of the precision that is needed to obtain an accurate positioning of robotic limbs.

It is a purpose of the proposed technology to provide alternative methods and apparatuses for the positioning a flexible element such as a robotic limb. This technology aims to at least alleviate the problems within the technical field and at the same time provide accurate positioning of extended flexible elements subject to forces and torques.

SUMMARY

It is an object to provide a sensor that improve the possibilities to determine the position and/or the orientation of a flexible element that is subject to forces and/or torques.

According to a first aspect, there is provided a sensor for enabling positioning of a flexible element subject to applied forces, the sensor comprises:

- at least two spatially separated light permeable tubes, each tube having a first end arranged on a first frame portion and a second end arranged on a second frame portion of the flexible element, wherein at least one of the first end and the second end of at least one light permeable tube are attached to a corresponding frame portion by means of a spherical bearing. The at least two spatially separated light permeable tubes further comprises,
- at least one light detecting device, connectable to a processing unit, and arranged at a light detecting position for a corresponding light permeable tube and configured to detect light emitted from at least one light emitting device through the corresponding light permeable tube and configured to transfer information comprising information relating to the detected light to the processing unit to enable the processing unit to determine the bend of the light permeable tube.

According to a second aspect of the proposed technology there is provided a flexible element comprising a sensor according to the first aspect. The flexible element might for example be a flexible robotic limb.

A third aspect of the proposed technology involves a method that enables a determination of the position and/or orientation of a moving frame portion of a sensor subject to forces and/or torques, the method comprises the steps of:

- obtaining values representing the detected light intensities for light having propagated through different light permeable tubes;

converting the values of the detected light intensities to length values corresponding to particular distances between the moving frame portion and a frame portion fixed relative said moving frame portion;

determining the position and/or the orientation of the moving frame portion relative the fixed frame portion based on the length values.

According to a fourth aspect of the proposed technology there is provided a computer program comprises instructions, which when executed by at least one processor, cause the processor(s) to:

read the values representing the detected light intensities for light having propagated through different light permeable tubes;

convert the values of the detected light intensities to length values corresponding to particular distances between the moving frame portion and a frame portion fixed relative the moving frame portion;

determine the position and/or the orientation of the moving frame portion relative the fixed frame portion based on the length values.

According to a fifth aspect there is provided a computer program product comprising the computer program of the fifth aspect.

An advantage of the proposed technology is that it enables an efficient way of determining the position and/or the orientation of a flexible element that is subject to applied forces and/or torques. There is in particular provided a robust sensor that provides highly accurate measurements that enables a highly accurate determination of the positioning and/or orientation of a flexible element comprising the sensor. Further advantages will be clear from the detailed description.

BRIEF DESCRIPTION OF THE DRAWINGS

The embodiments, together with further objects and advantages thereof, may best be understood by making reference to the following description taken together with the accompanying drawings, in which:

FIG. 3a is a schematic illustration of a sensor according to the proposed technology.

FIG. 3b is a schematic illustration of a sensor according to the proposed technology.

FIG. 10b is an alternative illustration of the embodiment of sensor according to FIG. 10a.

FIG. 11b is an alternative illustration of the embodiment of sensor according to FIG. 11a.

DETAILED DESCRIPTION

Throughout the drawings, the same reference designations are used for similar or corresponding elements.

Figure 1:
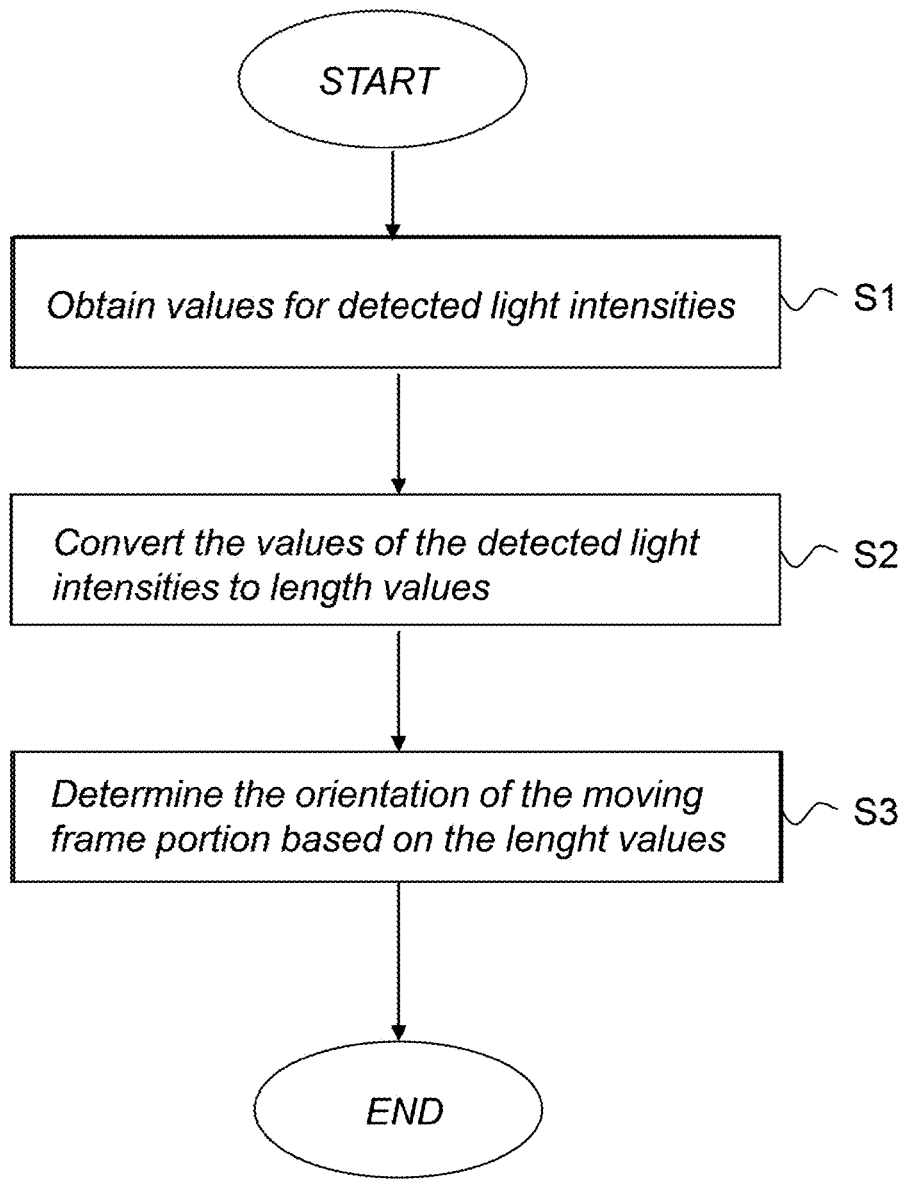
FIG. 1 is a flow diagram illustrating a method according to the proposed technology.

For a better understanding of the proposed technology, it may be useful to begin with a brief overview of how a sensor according to the proposed technology may be used to position dynamically changing flexible elements. The positioning relies on the features of a sensor design that is schematically shown in FIG. 1. The sensor design makes use of certain optical characteristics of light to provide a measure of the forces and torques that are applied to the sensor.

To this end the sensor is provided with a number of spatially separated light permeable tubes whose end portions are attached to first and second frame portions, respectively. During regular use of the sensor, forces will either be applied directly on the frame portions or applied indirectly on the frame portions in those cases when the frame portions are embedded in an outer structure. The applied forces will have the effect that the light permeable tubes attached to the frame portions will be bent if the initial configuration was straight or straightened if the initial configuration was bent. To provide for a positioning of the flexible element/robotic limb even after applied forces the sensor has to be able to determine the bend of the tubes. To achieve this purpose light is used. That is, light from one or more light sources is emitted into each of the light permeable tubes through a first end of the tube. This light is allowed to propagate in the tubes all the way to specified light detection positions. In these light detection positions the light is detected and certain characteristics, such as light intensity, is extracted. The extracted light characteristics are then processed to obtain a measure of the bend of each of the light permeable tubes. Since light propagates and is detected in all of the individual tubes and since these tubes are spatially separated and thus independently bent one obtain a high quality measure of the bend of each individual tube. Once the bends of the individual tubes has been determined, further method steps, to be described in detail in what follows, are used to obtain a positioning and orientation of the frame portions relative their initial positions.

In a slightly more detailed exposure, the necessary measurements providing the possibility to position a flexible element such as a robotic limb can be obtained by providing a common light emitting source for all light permeable tubes or by providing each single light permeable tube with a light emitting diode, LED, or some other light emitting source. The light emitting source(s) is configured to emit light into each tube. To power the light emitting sources one might connect them to some voltage source, such as a battery, and suitable resistors. Now while the light emitting source(s) emits light through the tube(s) each of the light permeable tubes in the sensor is also provided with light detectors that is configured to measures the light intensity in some other chosen position of the tube(s). These light detecting devices could, for example, be photo diodes or photo transistors, and they are configured to detect the amount of photons that reaches the detectors which will provide an estimate of the intensity of the light at the position of the light detectors. The amount or number of photons that reaches the detector in a single tube is dependent on the bend of the tube as the tube, when bent, will absorb some of the photons hitting the inner surface. Generally, the higher the bend the higher the absorption of the tubes surface will be, and it is therefore possible to estimate the bending degree of the tube(s) by using information about the tubes inner surface, the strength of the light emitting source and the light detector's reading.

Having described the technology in broad terms above we will now continue to describe various detailed embodiments of the technology.

The proposed technology relates to a sensor that enables the positioning of a flexible element, for example, a robotic limb. The sensor as such can however be used in other applications where a positioning of certain elements subject to forces and torques are requested. The features of the sensor do not depend on the specific application. It is rather a device that provides highly accurate positioning of dynamically changing flexible elements and can thus find a multitude of applications beyond the realm of robotics. In this description it will however be used in relation to the positioning of a robotic limb.

Figure 2A:
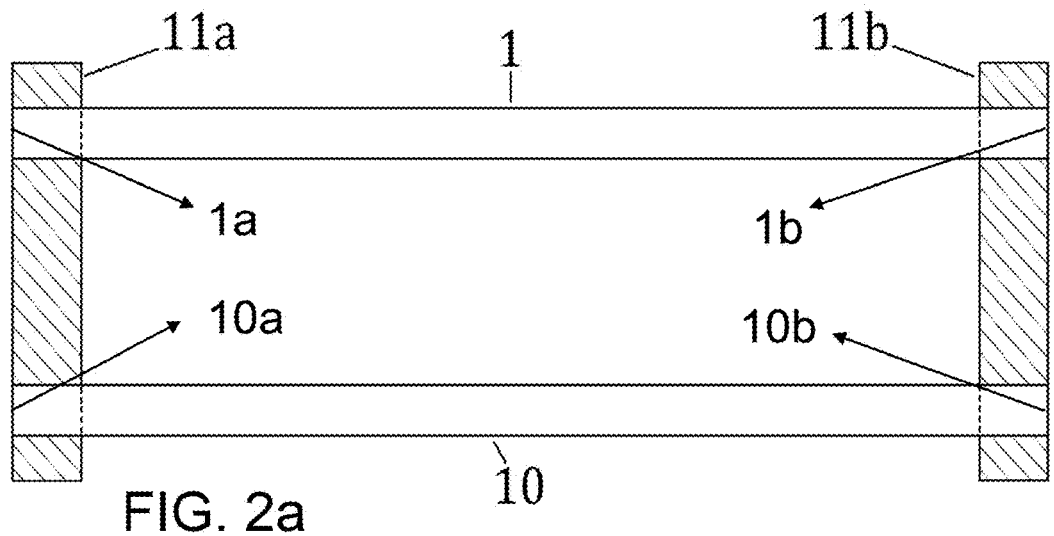
FIG. 2a is a schematic illustration of a sensor according to the proposed technology.
Figure 2B:
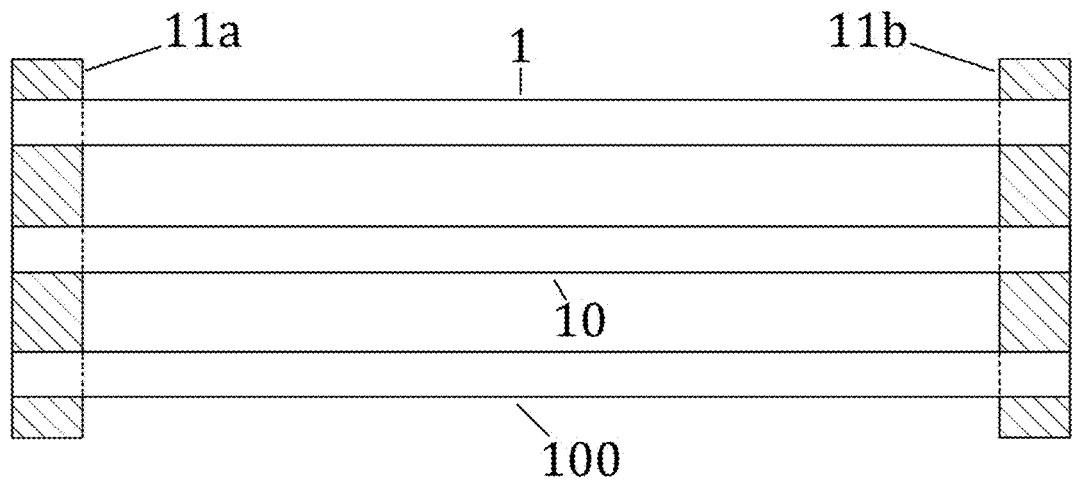
FIG. 2b is a schematic illustration of a sensor according to the proposed technology.

In FIG. 2b there is schematically shown the structure of the light permeable tubes comprised in a sensor according to the present disclosure. In FIG. 2b there is shown how the end portions of three light permeable tubes 1, 10, 100 are attached to frame portions 11a and 11b.

With reference to FIG. 2b, there is shown an example of a sensor that enables a positioning of a robotic limb comprising the sensor. The sensor comprises however at least two spatially separated light permeable tubes 1, 10 having a first end 1a, 10a arranged on a first frame portion 11a and a second end 1b, 10b arranged on a second frame portion 11b of the robotic limb. The sensor also comprises a light detecting device 3, that can be connected to a processing unit 4 and that is arranged at a light detecting position of each of the light permeable tubes and that is configured to detect light emitted from a light emitting device 2 through the at least two light permeable tubes 1, 10 and also configured to transfer information comprising information relating to characteristics of the detected light to the processing unit 4.

With the term spatially separated above is meant that the light permeable tubes are uncoupled, that is, not bound to each other over at least large parts of their lengths. This is to ascertain that the result of measurements relating to a specific tube is independent of the result of the measurement of other tubes. In other words, each light permeable tube provides for an independent degree of freedom when it comes to measurements and will as such provide unique information that can be processed to enable the positioning of a flexible element such as a robotic limb. The term light permeable tubes means that the light are allowed to propagate along the tubes from an inlet arranged at the first end 1a, 10a, to an outlet arranged at the second end 1b, 10b. The tubes could in certain embodiments be prepared in such a way that most of the light that hits the inside surface of the tube is reflected back towards the bulk of the tube.

The frame portions 11a and 11b that constitutes the bases on which the light permeable tubes are attached are also the structures where the forces are applied. Directly on the frame portions for those cases where the sensor is free and indirectly when the sensor is embedded in an outer structure such as a flexible element, i.e. a robotic limb. In the latter case the applied force will be transferred on to the frame portion via the outer structure and should therefore be attached to the flexible element in a way that transfers the force as easy as possible. The sensor utilizes light permeable tubes. With the term light permeable tube is intended tubes whose interior allows light to propagate more or less freely. These tubes could, for example, be hollow tubes but they may also be more elaborate constructions such as optical fibers. The important feature of the tubes is however that they should allow light to propagate largely undisturbed within its interior. The tubes are preferably made of a flexible material, and they could be made out of light weighted carbon fibers or optical fibers being strengthened by an outer layer of a light-weight material such as carbon fiber. In yet another exemplary embodiment the tubes could be provided with electrically conducting means that allows current to be fed between the frame portions. They could also be partially provided with such means to provide for the possibility that current can be conducted along at least parts of the surface of the tubes. Examples of such means are electrically conducting stripes or electrically conducting material embedded in the material of the outer layer of the tubes. The purpose of such an embodiment is that it provides a way to utilize a sensor within, for example, a robotic limb as both a sensor and as a current conductor. In this way the amount of wires and cables carrying currents can be reduced. This provides for the possibility of a more light-weighted robotic limb.

In appendix 1 and 2 there is provided an outline of how the detected light characteristics may be used to enable the positioning of a flexible element.

In what follows there will be described a number of different embodiments of the general sensor described above.

According to a particular embodiment of the proposed technology there is provided a sensor for enabling positioning of a flexible element subject to applied forces. The sensor comprises:

at least two spatially separated light permeable tubes 1, 10 each having a first end 1a, 10a arranged on a first frame portion 11a and a second end 1b, 10b arranged on a second frame portion 11b of the flexible element, and wherein each of the at least two spatially separated light permeable tubes comprises, a light emitting device 2, a light detecting device 3, connectable to a processing unit 4, and arranged at a light detecting position of each of the light permeable tubes and configured to detect light emitted from the light emitting device 2 through each of the at least two light permeable tubes 1, 10 and configured to transfer information comprising information relating to the detected light to the processing unit 4 to enable the processing unit to determine the bend of the light permeable tubes 1, 10 a reference detector 30, arranged in the vicinity of the light emitting device 2, the reference detector is configured to detect light emitted from the light emitting device before the light has entered the light permeable tubes to thereby obtain a reference measure of the light characteristics, the reference detector is also configured to transfer information about the obtained measure to the processing unit 4 to enable the processing unit to determine the bend of the light permeable tubes 1, 10. This particular example of an embodiment is shown in FIG. 3a.

By providing the sensor with a reference detector 30 it will be possible to ensure that certain initial light characteristics that are used for determining the bend of the light permeable tubes are given correct values. If, for example, light intensity is used as the light characteristic that enables the tube bends to be determined than, since the quantum efficiency of a light emitting diode depends on temperature, the initial light intensity may need to be adjusted in order to obtain a more accurate determination of the bend. This embodiment ensures that the input to the processing unit represents the actual light intensity of the light that is emitted through each of the at least two light permeable tubes 1, 10. A possible way to provide the reference detector with light is by utilizing a beam splitter arranged between the light emitting device(s) or light emitting source(s) and the tubes. Light emitted from a particular source will thereby be split into two beams, one propagating through the tube and the other being directed towards the reference detector 30.

According to another embodiment of the proposed technology there is provided a sensor for enabling positioning of a flexible element subject to applied forces. The sensor comprises:
at least two spatially separated light permeable tubes 1, 10 each having a first end 1a, 10a arranged on a first frame portion 11a and a second end 1b, 10b arranged on a second frame portion 11b of the flexible element, and wherein each of the at least two spatially separated light permeable tubes comprises,
a plurality of light emitting devices 2, 22, 222, each configured to emit light of a specified wavelength through the corresponding light permeable tube,
a plurality of light detecting devices 3, 33, 333 arranged at a light detecting position and being connectable to a processing unit 4, each of the light detecting devices 3, 33, 333 being configured to detect light of a specified wavelength emitted from a corresponding light emitting device 2, 22, 222, each of the light detecting devices 3, 33, 333 is further configured to transfer information comprising information relating to the detected light to the processing unit 4 to enable the processing unit to determine the bend of the light permeable tubes 1, 10. This particular example of an embodiment is schematically shown in FIG. 3b. In FIG. 3b there is also shown three references detectors 30, 350, 355 each of the reference detectors being configured to detect light from a particular light emitting device to provide reference values for the emitted light. The reference detectors 30, 350 and 355 are optional in this embodiment.

By providing several light emitting sources, or equivalently several light emitting devices, and corresponding light detecting devices that are tuned to emit and detect, respectively, light of a certain wavelength the sensor will be able to provide a more robust output. Moreover the inclusion of several light emitting sources and light emitting devices provide better redundancy is those cases where one of light emitting devices and/or one of the light detecting devices becomes non-operative, e.g. gets broken. In a particular embodiment it is possible to provide the processing unit 4 with instructions to perform an algorithm whereby the outputs from the different light detecting devices 3, 33, 333 are compared and the most viable is used to determine the bend of the light permeable tubes 1, 10. In a possible embodiment the number of light emitting devices 2, 22, 222 and corresponding light detecting devices 3, 33, 333 may moreover be an odd number larger than or equal three. In this way it will be possible to provide the processing unit 4 with instructions to perform an algorithm whereby the outputs from the different light detecting devices 3, 33, 333 are compared and voting is performed to provide the most probable estimation of the bend of the light permeable tubes 1, 10. This comparison algorithm might in a particular case be based on a voting functionality whereby the most appropriate value is extracted from the several outputs of the various light emitting devices by means of a majority vote. This could for example be performed by means of a Field Programmable Gate Array, FPGA. A particular embodiment of the proposed technology comprising three light emitting devices 2, 22, 222 and corresponding light detecting devices 3, 33, 333 is shown in FIG. 3b.

A possible embodiment of a sensor comprising a plurality of light emitting devices 2, 22, 222 also comprises a beam splitter arranged between at least a subset of the light emitting devices 2, 2, 222 and a particular tube. The beam splitter is configured to collimate beams of light emitted from different light emitting devices and direct them towards a particular tube. It will in this way be possible to provide a single tube with light emitted from several different light emitting devices, by having corresponding detectors that detects characteristics of the light that has propagated through the tube, a single tube with beam splitter will therefor provide more information than a tube provided with light from a single source. The embodiment might also comprise beam splitters for the corresponding light detecting devices 3, 33, 333. That is, beam splitters are provided between the outlet of the tube and the light detecting devices 3, 33, 333

The light emitting devices 2, 22,222 which might be regular light emitting diodes, could either be provided externally from the sensor or could be integrated into the sensor. In the case where they are arranged externally from the sensor they should be arranged on an outer element so that they can emit light into the light permeable tubes 1. Such an outer element could for example be the main robot body if the sensor is either incorporated in a robotic limb or if the sensor with its frame portions constitutes a robotic limb. All of the light permeable tubes could be provided with their own light emitting devices 2 dedicated to emit light through their allocated light permeable tube. It could however also be a single set of light emitting devices that are allocated to multiple light permeable tubes.

Figure 4A:
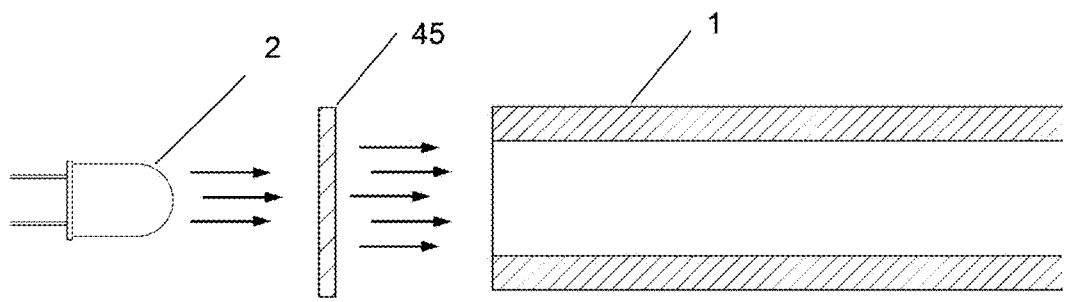
FIG. 4a is a schematic illustration of a sensor according to the proposed technology.

Still another embodiment of the proposed technology provides a sensor for enabling positioning of a flexible element subject to applied forces. The sensor comprises:
at least two spatially separated light permeable tubes 1, 10 each having a first end 1a, 10a arranged on a first frame portion 11a and a second end 1b, 10b arranged on a second frame portion 11b of the flexible element, and wherein each of the at least two spatially separated light permeable tubes comprises,
a light emitting device 2 arranged at one end of the light permeable tube and configured to emit light through the corresponding light permeable tube;
a light detecting device 3, connectable to a processing unit 4, and arranged at a light detecting position of the light permeable tube and configured to detect light emitted from light emitting device 2, and configured to transfer information comprising information relating to the detected light to the processing unit 4 to enable the processing unit to determine the bend of the light permeable tubes 1, 10, a diffusion filter 45 arranged between the light emitting device 2 and the light permeable tubes. A particular example of an embodiment of such a sensor is schematically shown in FIG. 4*a*.

Figure 4B:
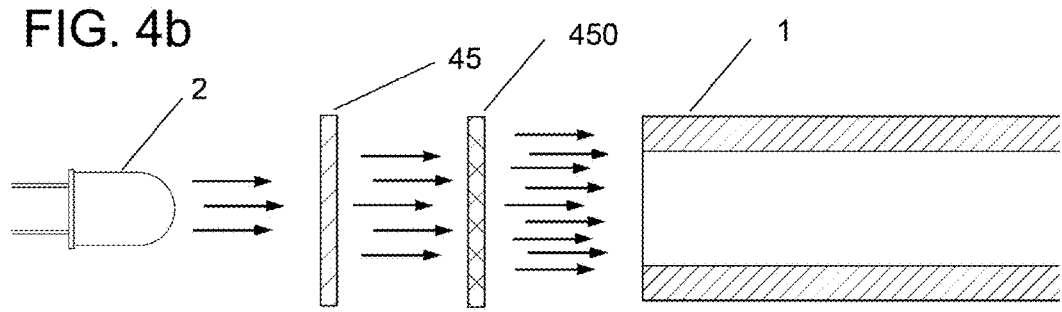
FIG. 4b is a schematic illustration of a sensor according to the proposed technology.

An alternative embodiment is shown in FIG. 4B, here two diffusion filters 45 are provided between the light emitting device and a tube. Having two or more filters arranged in succession renders the light even more By providing a diffusion filter between the light emitting device(s) and the light detecting device it provides for a means whereby the light emanating from the light emitting sources enters the at least two spatially separated light permeable tubes 1, 10 in a more isotropic fashion. Consider light emitted from a light emitting device 2 into a light permeable tube, initially the light propagates towards the tube with a rather narrow Gaussian, by providing a diffusion filter the variance of the Gaussian gets enhanced and the noise gets reduced, hence the light that enters the tube has a broader Gaussian shape. This in turn ensures that the light that enters the tube is more isotropic. This in particular reduces the risk that the detected light displays characteristics that are dependent on collimated light features. A particular embodiment of the proposed technology is illustrated in FIG. 4*a*, here there is only shown a single light emitting device 2 and a diffusion filter 46 arranged between the light emitting device 3 and a single light permeable tube. This might however be generalized so that there is any number of light permeable tubes together with any number of light emitting devices, it could for example be a single, or only a few, light emitting device(s) for any number of tubes or as many light emitting devices as there are tubes or any other possible combination. On the same token, there can be provided any number of diffusion filters, for example one filter applied to all light emitting devices, or a filter per light emitting device or any possible variation. The only thing that is important is that the filter renders the light emitted into the tubes more isotropic.

An alternative embodiment is shown in FIG. 4B, here two diffusion filters 45 and 450 are provided between the light emitting device and a tube. Having two or more filters arranged in succession renders the light that enters the tubes even more isotropic.

Figure 4C:
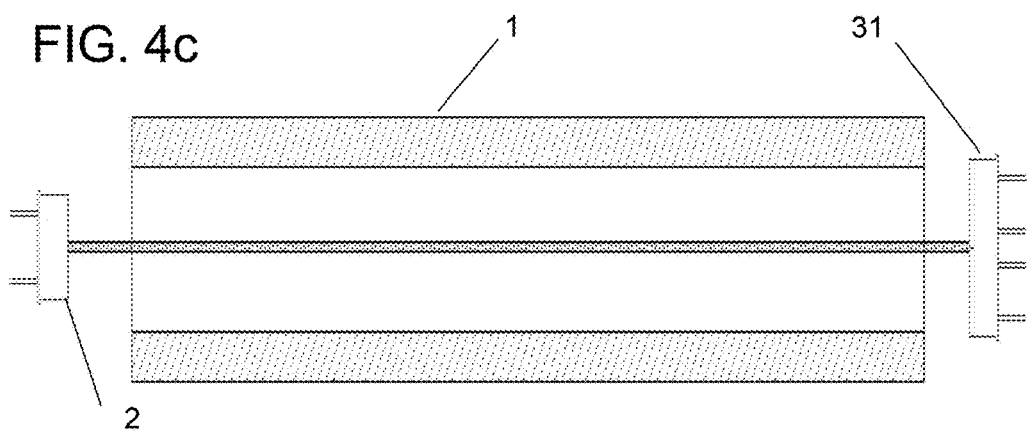
FIG. 4c is a schematic illustration of an embodiment of a sensor according to the proposed technology.

Another version of a sensor might also be provided with diffusion filters arranged on the light detecting side of the tubes. In this way there is provided a sensor where the outgoing light passes through a diffusion filter before it is detected by the light detecting device. This will ensure that the detected light is isotropic when detected Yet another embodiment of the proposed technology provides a sensor for enabling positioning of a flexible element subject to applied forces. The sensor comprises:

at least two spatially separated light permeable tubes 1, 10 each having a first end 1*a*, 10*a* arranged on a first frame portion 11*a* and a second end 1*b*, 10*b* arranged on a second frame portion 11*b* of the flexible element, and wherein each of the at least two spatially separated light permeable tubes comprises, a light detecting device 3 in the form of an array of photodiodes 31, connectable to a processing unit 4, and arranged at a light detecting position of each of the at least two light permeable tubes and configured to detect light emitted from a light emitting device 2 emitting laser light through each of the at least two light permeable tubes 1, 10 and configured to transfer information comprising information relating to the detected light to the processing unit 4 to enable the processing unit to determine the bend of the light permeable tubes 1, 10. An embodiment of such a sensor is shown in FIG. 4*c*.

By providing an array of photo diodes 31 as the light detecting device together with a light emitting source in the form of a laser, the proposed sensor provides a way whereby the bend of the tubes 1, 10 can be obtained by utilizing the detected light in each particular array element of the photodetector array. One embodiment of the array of the photodetectors comprises a linear array where a number of photodetectors are arranged along a line. Another embodiment relates to a case where the array is a two dimensional array whose surface is facing the end section of the corresponding tube. In other words, the two dimensional array comprises a number of photodetectors arranged in a matrix facing the end section of the corresponding tube. In a particular example could this array of photodetectors be a quadrant photodiode. By detecting light intensities on the different quadrants it will it be possible to determine the most probable configuration of the tubes. If, for example, the upper quadrants detects a substantially larger amount of light it is highly likely that the tube has been bent downwards relative the quadrant photodiode. The use of a light emitting source in the form of a laser facilitates the use of a quadrant photodiode since the laser is not substantially effected by the inside surfaces of the tubes. This particular embodiment therefore provides a way to obtain more explicit, or fine grained, information about the light emitted through the tubes. This fine grained information that is extracted by means of the exposure of light on the various array elements in the photo diode array 31 will in turn enhance the precision with which the bend of the tubes can be determined. It may in particular reduce the number of light permeable tubes used in the sensor.

A potential variation of a sensor that is able to provide a positioning of a flexible element comprises a sensor where a particular position of the tubes is provided with a glass element that at least partially covers the cross-section of the tube. Depending on the degree of bending of the tube this glass element will reflect different amounts of light, thereby providing a mechanism whereby the detected light intensity depends on the degree of bending of the tubes.

Still another embodiment of the proposed technology provides a sensor for enabling positioning of a flexible element subject to applied forces. The sensor comprises:

at least two spatially separated light permeable tubes 1, 10 each having a first end 1*a*, 10*a* arranged on a first frame portion 11*a* and a second end 1*b*, 10*b* arranged on a second frame portion 11*b* of the flexible element, wherein at least one of the first end 1*a*, 10*a* and second end 1*b*, 10*b* are attached to the corresponding first frame portion 11*a* and second frame portions 11*b* by a joining means 120, and wherein each of the at least two spatially separated light permeable tubes comprises, at least one light detecting device 3, connectable to a processing unit 4, and arranged at a light detecting position of each of the light permeable tubes and configured to detect light emitted from at least one light emitting device 2 through each of the at least two light permeable tubes 1, 10 and configured to transfer information comprising information relating to the detected light to the processing unit 4 to enable the processing unit to determine the bend of the light permeable tubes 1, 10. A schematic illustration of such a sensor is provided by FIG. 5.

Figure 6:
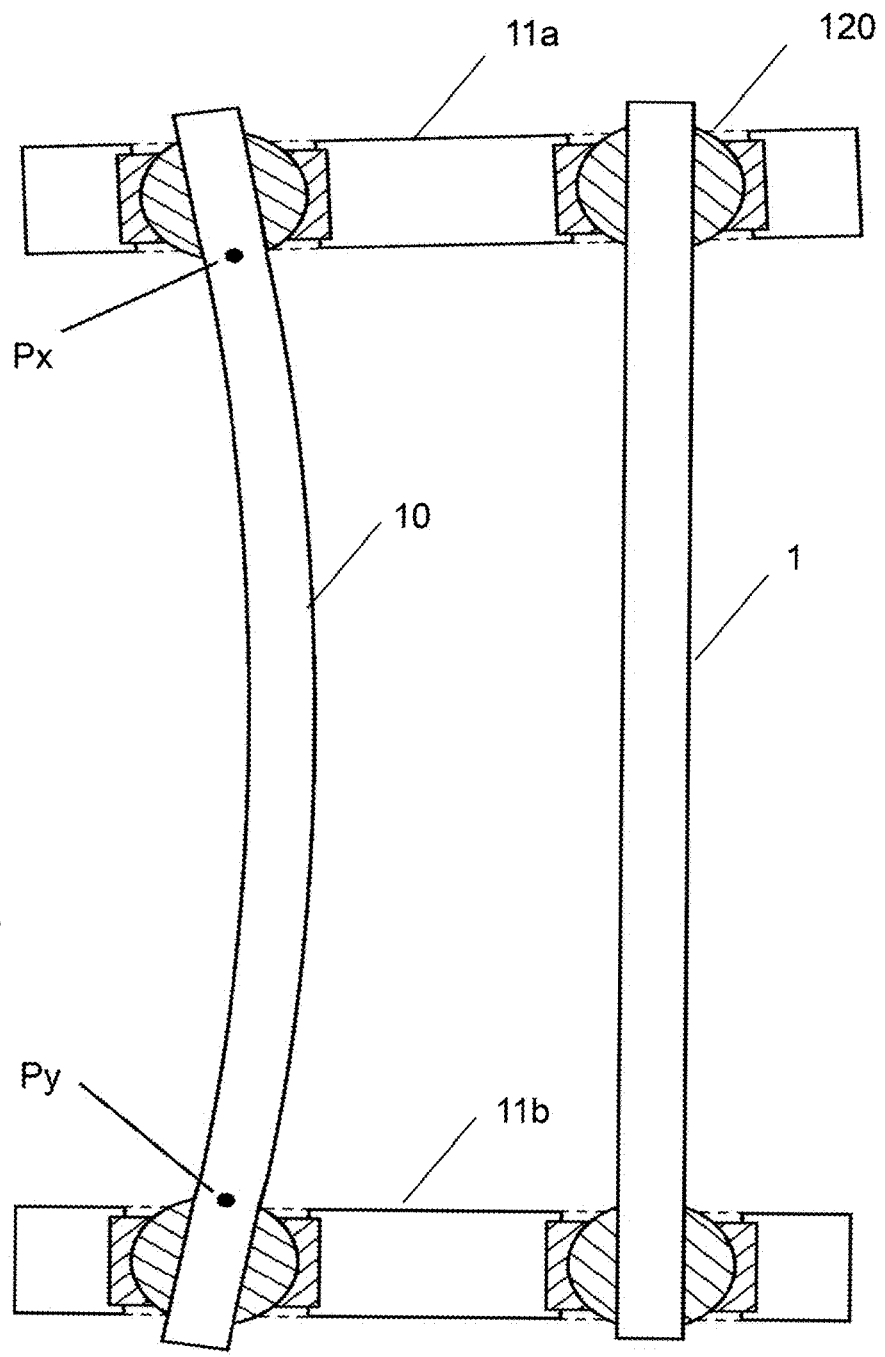
FIG. 6 is a schematic illustration of an embodiment of a sensor according to the proposed technology.

The joining means 120 should be preferably be of a type that allows the tubes to move or bend in a direction that is transversal to the frame portion containing the attachment point or attachment section. That is, if a tube are attached to a frame at a specific point then the joining means should provide for the possibility for the tube to be translationally fixed in the frame portion but allowed to rotate around its attachment point. The joining means 120 may for example be a joining means such as a spherical bearing or a universal joint. The use of joining means as a mechanism for attaching or fastening the tubes to the frame portions enables a highly efficient positioning of the flexible elements. This is related to the fact that when the sensor is provided with such joining means as spherical bearings, or equivalently spherical plain bearings or universal joints, the curvature of the tube between the fastening points take the shape of a half sine wave in some direction, at least for most realistic cases. The amplitude of the sine wave is inversely proportional to the length between the points. As the tubes attenuation is proportional to the bend of the tubes, the intensity readings will therefore be proportional to the length between the fastening points. Hence these joining means enables a more simplified determination of the bend of the tubes since it imposes that the shape of the tubes, when a force or torque has been applied to the frame portion to which the tubes are attached, take the form of a half sine wave. A detected light intensity thereby provide a proper measure of the distance between the two frame portions. This is schematically illustrated in FIG. 6 where a force has been applied to one of the frame portions 11*a* or 11*b*. The force has forced the frame portions closer to each other and the tube 10 has acquired a curvature or bend. Since the tube 10 are attached to the frame portions by means of joining means 120, such as a spherical bearings, the shape of the curvature takes the form of a half sine wave. A detection of the intensity of light having propagated through the tube 10 can thus be used to obtain a distance between two points on the tube, for example Px and Py in the figure, or the distance between the frame portions 11*a* and 11*b*. The distance between the frame portions 11*a* and 11*b* can then be used to position a flexible element that comprises the frame portions 11*a* and 11*b*. It can moreover be used to provide an orientation of a frame portion relative the other. This will be described more in what follows.

A particular embodiment of a sensor comprising joining means 120 relates to a sensor where one of the frame portions 11*a* are fixed and the other frame portion 11*b* is allowed to rotate. If the end point of a tube 1 is attached to frame portion 11*a* in a fixed manner and the tube 1 is attached to the frame 11*b* by a joining means 120 that allows the end of the tube to rotate around its point of attachment, then a rotation of the frame portion 11*b* will lead to a torsion of the tube. This embodiment can be used to obtain a measure of the torsion. The joining means 120 may in this example be a universal joint. On the other hand, for this particular case, if the joining means 120 attaching tube 1 to frame portion 11*b* is a spherical bearing, there will be no torsion. It may therefore be seen that one can provide the sensor with different joining means 120 whereby different ends of the tubes can be attached to their corresponding frame portions by different joining means 120, such as a spherical bearing at one end and a universal joint at the other. The different purposes of the sensor dictating what configuration to use.

Another advantage with this particular embodiment is that it also counters potential skewing effects on the tubes which make the sensor more accurate since skewing effects might affect characteristics of light that propagates through a tube that has been skewed by applied forces or torques.

This advantageous effect can be obtained by using a joining means 120 such as a spherical bearing, a cardan joint or a universal joint. The tubes will therefore be attached to the frames by these joining means.

According to a particular embodiment, one of the ends of one light permeable tubes, say tube 1, may be attached to a corresponding frame by means of such joining means 120.

Another embodiment provides a sensor where each end of at least one tube 1, 10 are attached to the corresponding frame portion 11*a*, 11*b* by means of joining means 120.

A particular embodiment provides a sensor where the joining means 120 comprises a spherical bearing or a universal joint.

Still another embodiment provides a sensor where one end of at least one tube 1, 10 are attached to one frame portion by means of a spherical bearing and the other end of the at least one tube 1, 10 are attached to the other frame portion by means of a universal joint.

Figure 5:
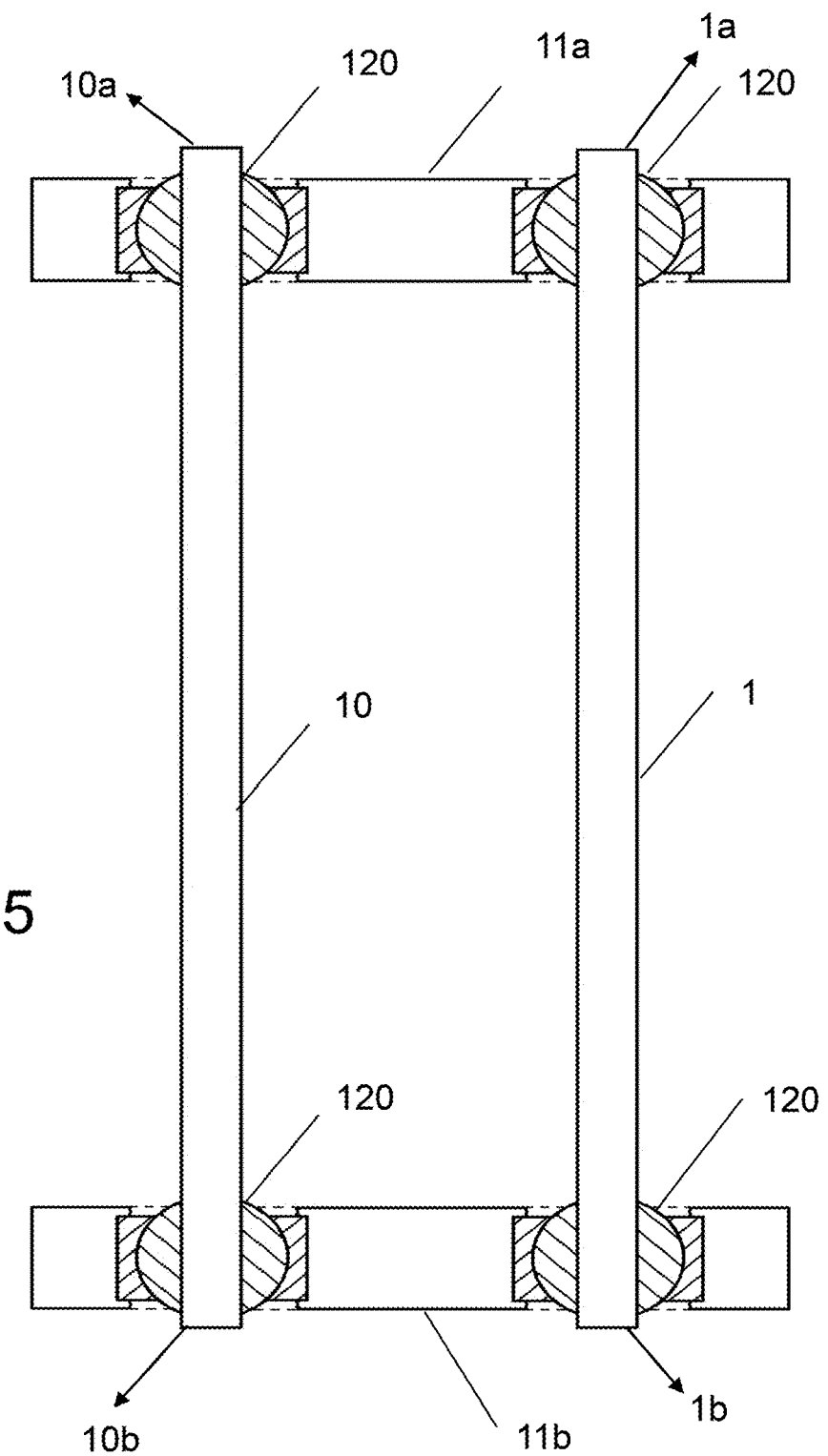
FIG. 5 is a schematic illustration of an embodiment of a sensor according to the proposed technology.

Another embodiment is obtained by attaching all ends of all light permeable tubes by means of joining means 120. This is schematically shown in FIG. 5 for the case of two light permeable tubes 1, 10. The joining means may differ from one end to another, for example a spherical bearing at one end and a universal joint at the other.

Figure 7:
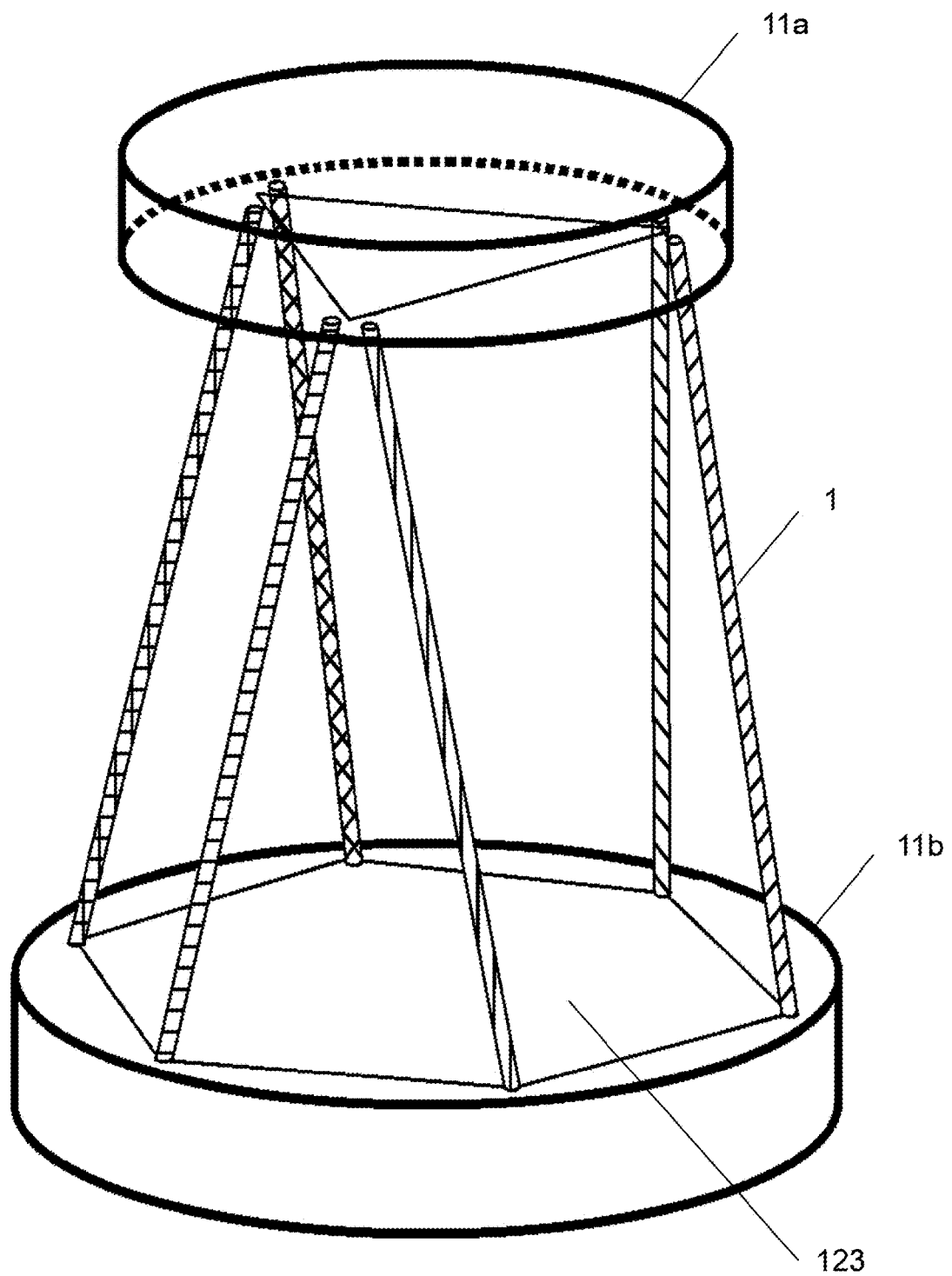
FIG. 7 is a schematic illustration of an embodiment of a sensor according to the proposed technology.
Figure 8:
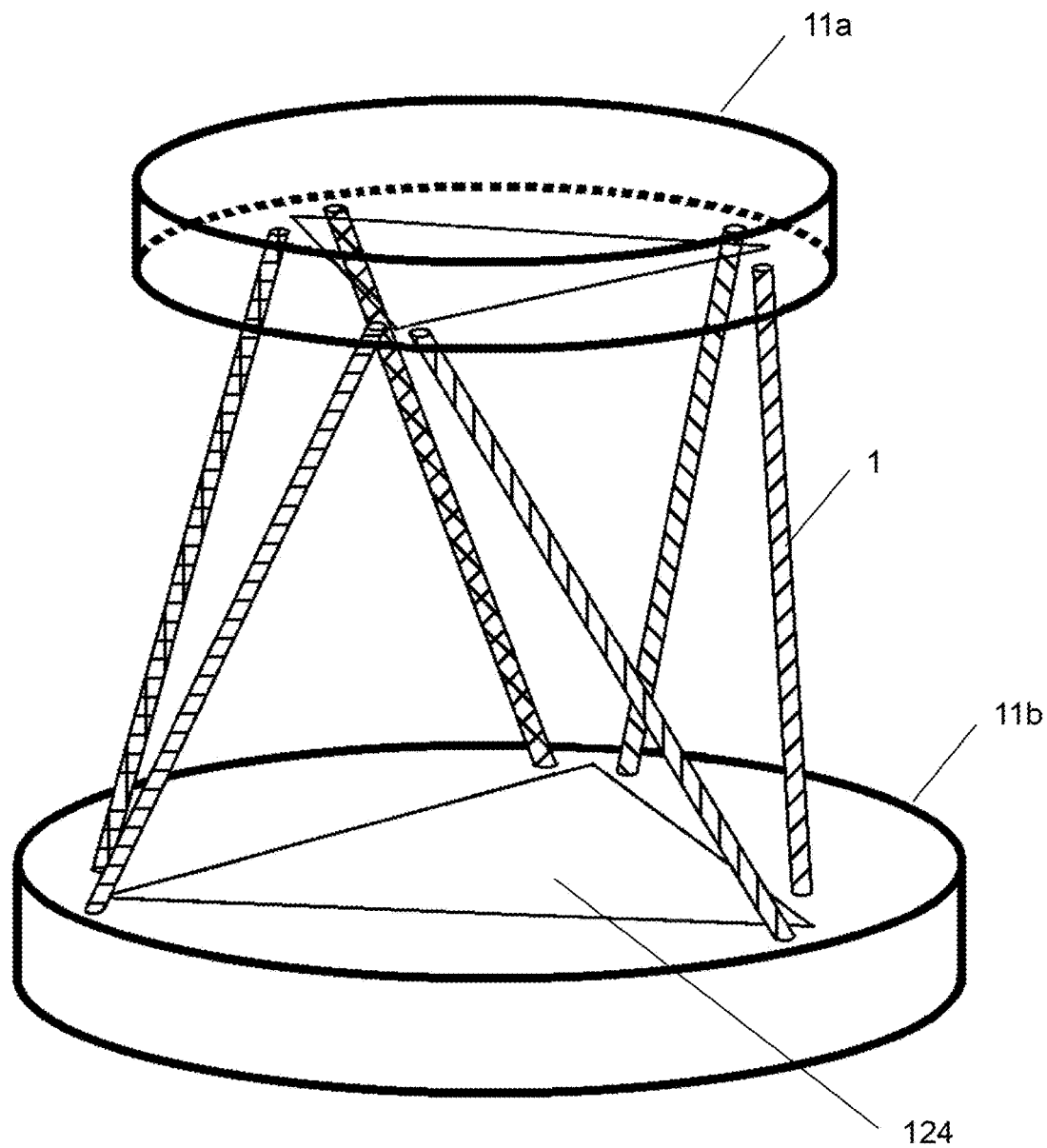
FIG. 8 is a schematic illustration of an embodiment of sensor according to the proposed technology.
Figure 9:
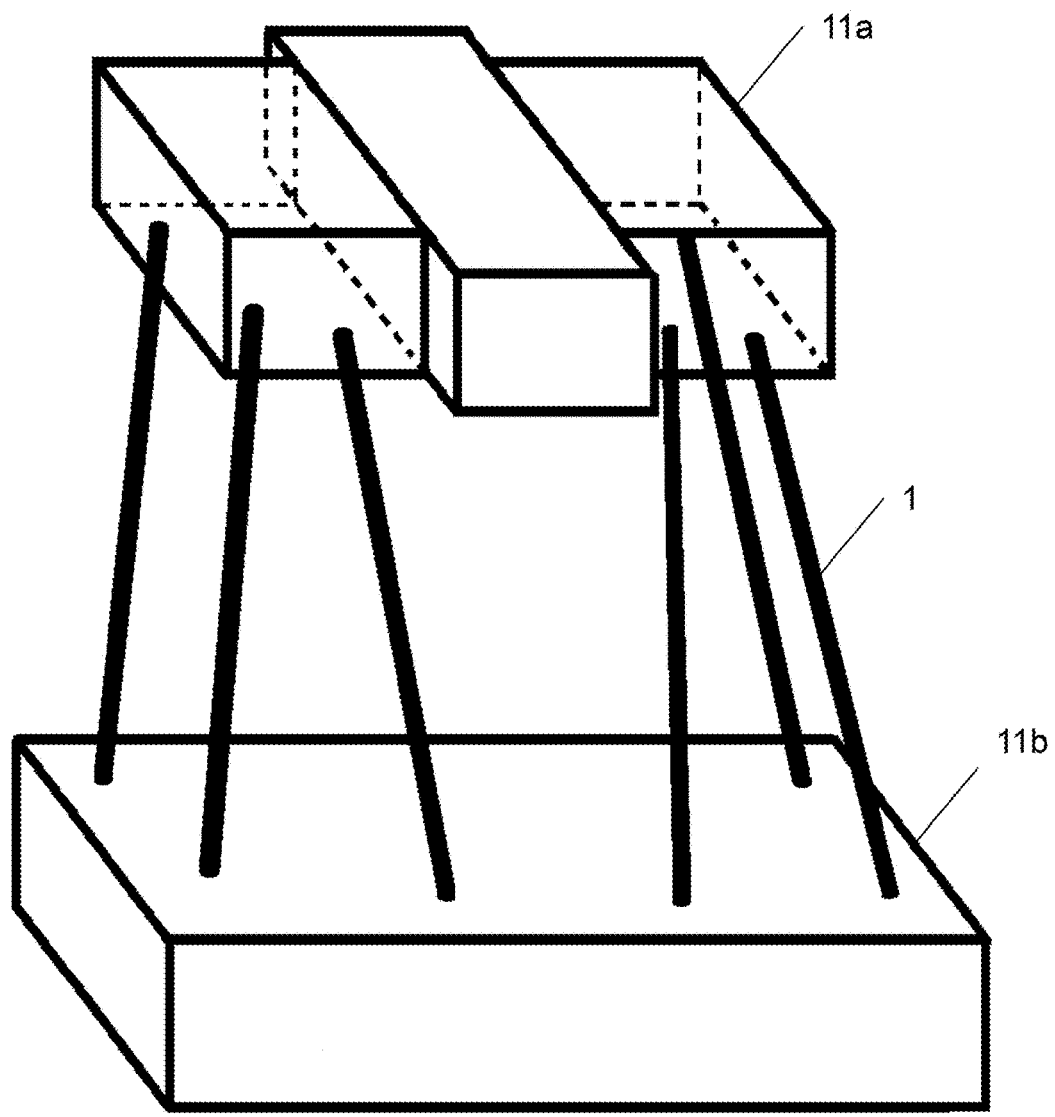
FIG. 9 is a schematic illustration of an embodiment of sensor according to the proposed technology.

Yet another embodiment of the proposed technology provides a sensor for enabling positioning of a flexible element subject to applied forces. The sensor comprises:

six spatially separated light permeable tubes 1, each tube having a first end 1*a*, arranged on a first frame portion 11*a* and a second end 1b arranged on a second frame portion 11*b* of the flexible element, and wherein each of the six spatially separated light permeable tubes comprises, a light detecting device 3, connectable to a processing unit 4, and arranged at a light detecting position of each of the light permeable tubes and configured to detect light emitted from a light emitting device 2 emitting light through the light permeable tubes and configured to transfer information comprising information relating to the detected light to the processing unit 4 to enable the processing unit to determine the bend of the light permeable tubes. A sensor provided with six light permeable tubes are schematically illustrated in FIGS. 7-9.

In one particular embodiment each of the six spatially separated light tubes is equipped with its own set of light detecting devices 3 and light emitting devices 2. That is, a single tube in the set of tubes may be provided with a plurality of light emitting devices 2, 22, 222 and corresponding light detecting devices. Moreover, each of the six spatially separated tubes may also be provided with either one or a set of reference detectors 30 for each light emitting device. Still another embodiment comprises a sensor provided with a diffusion filter 45.

Many different configurations are possible for a sensor that comprises six light permeable tubes. Two especially useful planar configurations comprises six light permeable tubes wherein the fastening points of six light permeable tubes on one frame portion 11*a* are arranged to correspond to either the vertices of a triangle 124 or the vertices of a hexagon 123, and the fastening points of six light permeable tubes on the other frame portion 11*b* to either the vertices of a triangle 124 or the vertices of a hexagon 123 or a combination of them, see FIGS. 7, and 8. The sides of the hexagon and triangle does not necessary have to be equal.

Such a fastening pattern simplifies the computations needed to position the flexible element. Many other setups are however possible besides these. It should also be noted that at least one frame portion might be a modular frame portion where different modular sections acts as fastening structures for different sets of light permeable tubes, this is shown schematically in FIG. 9.

A sensor comprising six tubes are particularly useful for a method, to be described below, that enables the determination of the orientation of a flexible element by utilizing detected light characteristics obtained by such a sensor. The flexible element being one of the frame portions 11a or 11b.

It should be noted that the particular features of all the described embodiments can be combined to provide a sensor that comprises all of the described features or any combination of the described features. Since the described features are mutually compatible it will be possible to provide a sensor comprising any combination of the features described above. In particular, different part solutions in the different embodiments can be combined in other configurations, where such configurations are technically possible.

As a first example it may be possible to provide a sensor comprising joining means 120 as described earlier with a light emitting device 3 that comprises a plurality of light emitting diodes, where each light emitting diode is configured to emit light of a pre-determined wavelength.

As a second example, a sensor comprising joining means 120 as described earlier might also comprise a reference detector 30 arranged in the vicinity of the light emitting device and being configured to detect light emitted from the light emitting device before the light enters the light permeable tubes 1, 10 to obtain reference values for certain light characteristics of the emitted light.

Still another example of an embodiment provides a sensor having joining means 120 and also a beam-splitter arranged between a light emitting device 3 and a light permeable tube. The beam-splitter being configured to direct part of the light emitted from the light emitting device 3 to the reference detector 30.

Yet another sensor comprising joining means 120 might comprise a diffusion filter ( ) arranged between the light emitting device 3 and the light permeable tube 1.

Moreover the sensor having joining means might be provided with six spatially separated light permeable tubes 1, 10.

Yet another version of a sensor comprising joining means 120 relates to a sensor where the number of light detecting devices 3 and light emitting devices 2 corresponds to the number of light permeable tubes and wherein each of the light detecting devices 3 and the light emitting devices are used for a designated light permeable tube 1, 10.

Still another version of a sensor provided with joining means provide a sensor where the light emitting device 2 comprises a laser and where the light detecting device 3 comprises an array of light detecting devices 3.

Figure 10A:
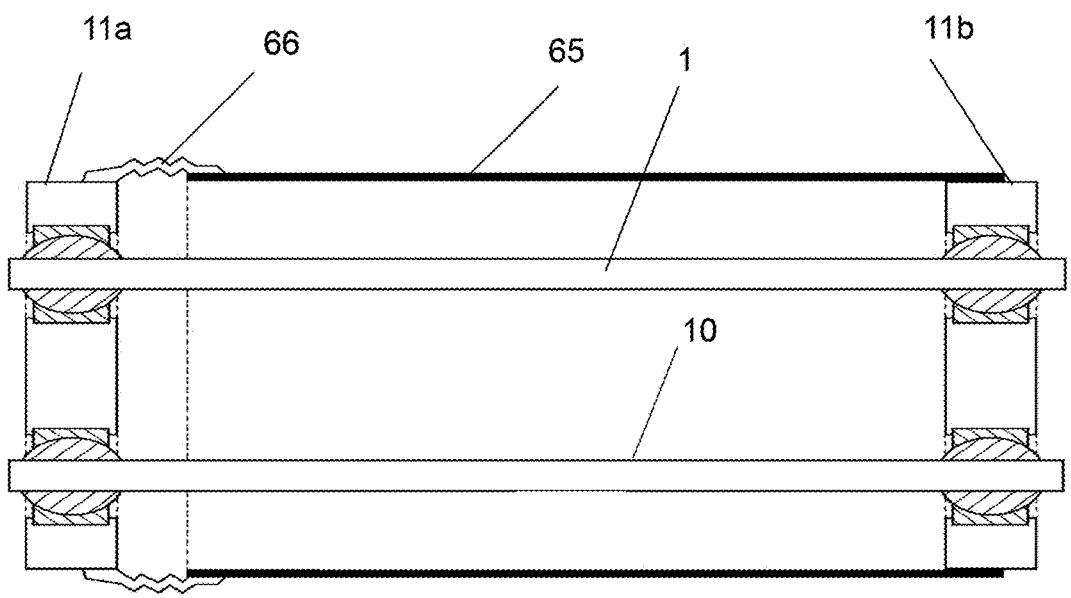
FIG. 10a is a schematic illustration of an embodiment of sensor according to the proposed technology.

The proposed technology also provides a flexible element comprising a sensor according to the described embodiments. This flexible element might be a robotic limb that comprises the sensor. Still another embodiment, relevant for all earlier described embodiments, provides a flexible element that also comprises a protective casing. FIG. 10a provides a schematic illustration of such a flexible element. The particular feature of a protective casing can be combined with all the earlier described embodiments. FIG. 10a discloses a flexible element comprising a sensor that comprises two light permeable tubes 1, 10 having their ends attached to frame portions 11a and 11b. The flexible element comprising the sensor are partially enclosed in a protective casing 65. The frame portions 11a and 11b of the sensor comprised in the flexible element should not be enclosed by the protective casing since they are supposed to be subjected to externally applied forces and torques.

Figure 10B:
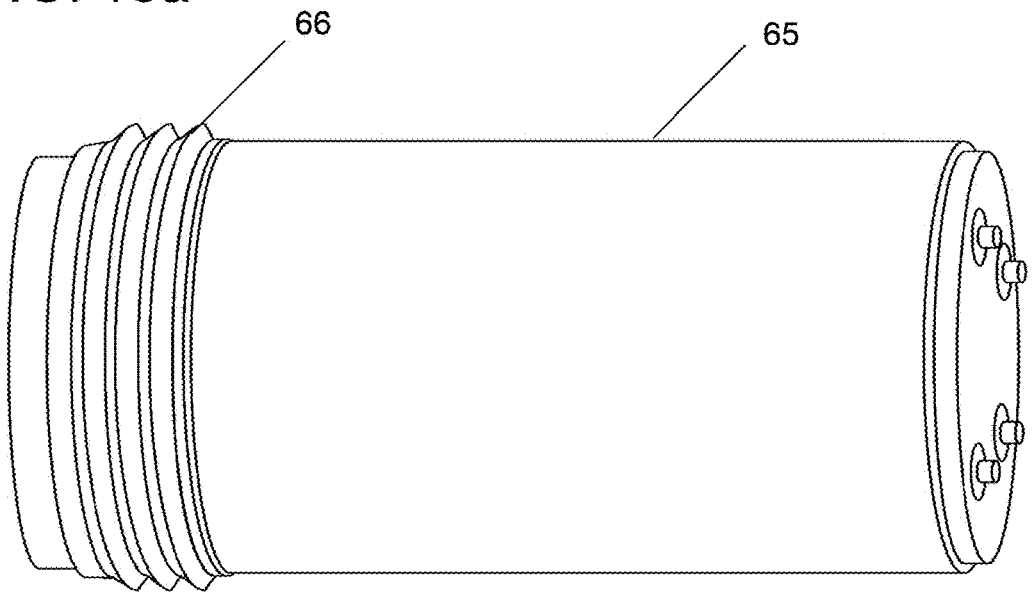

The number of light permeable tubes may vary, two is shown only to simplify the illustration. The protective casing 65 ensures that the possibly delicate tubes are protected from damage. The protective casing might furthermore comprise one or more elastic segments 66. The inclusion of an elastic segment 66 in the protective casing 65 will reduce the potential effect that vibrations induced from external sources have on the sensor. The protective casing 65 is preferably manufactured from a rather hard material to ensure that the interior is adequately protected from damaging effects. It is also preferred if the material is a light weight material to ensure that the use of the sensor in, for example, a robotic limb is energy efficient. The elastic segment 66 might, for example, be rubber or some other elastic material that can be bound to the protective casing 65. FIG. 10b provides another illustration of the protective casing 65 with an elastic segment 66 where the internal components are hidden. The protective casing comprising the elastic segment could be attached to the flexible element comprising the sensor by attaching at least part of the casing to the frames 11a and 11b of the sensor.

In other words, it is provided a flexible element comprising a protective casing 65 that is partially enclosing the flexible element. The protective casing might comprise at least one segment 66 of an elastic material.

Figure 11A:
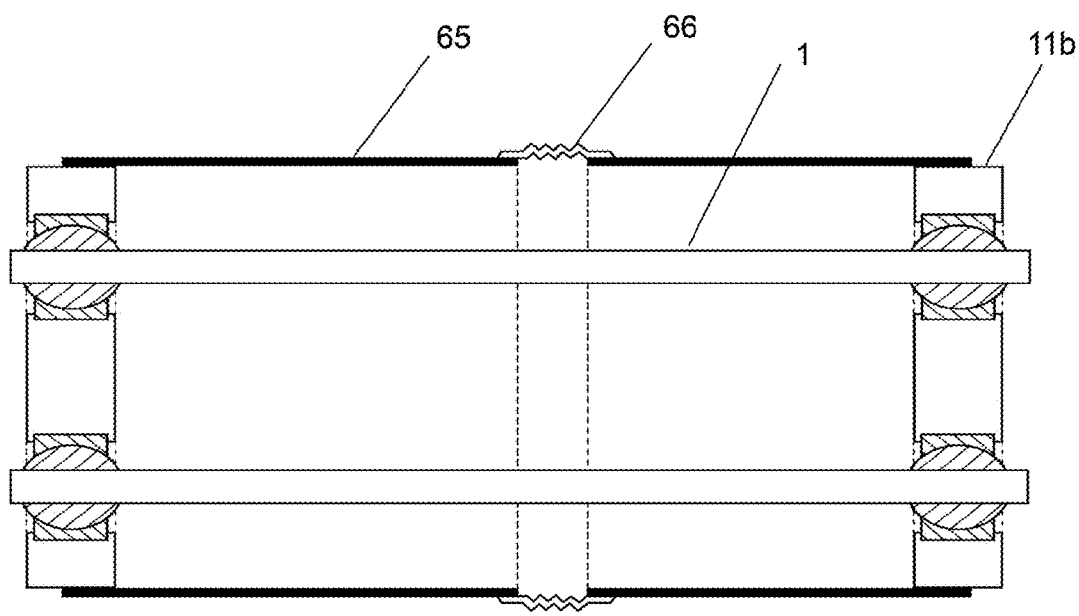
FIG. 11a is a schematic illustration of an embodiment of sensor according to the proposed technology.
Figure 11B:
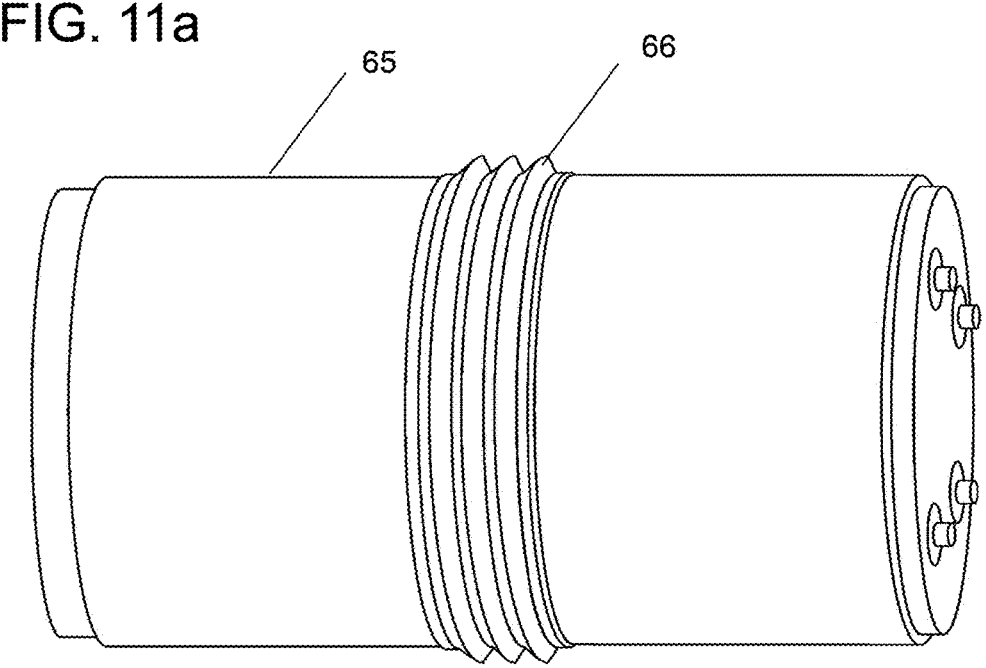

The elastic segment may be arranged at one end of the protective casing as seen in FIG. 10a but it might also be arranged at some other location such as in the middle of the casing, as illustrated in FIG. 11a. An alternative view of a sensor comprising a protective casing 65 and elastic segment 66 is shown in FIG. 11B.

The proposed technology also provide a method that enables a determination of the position or the orientation of a moving frame portion 11a of a sensor subject to applied forces and torques. The sensor comprises:
  six spatially separated light permeable tubes 1, each tube having a first end 1a, arranged on a first frame portion 11a and a second end 1b arranged on a second frame portion 11b, and wherein each of the six spatially separated light permeable tubes comprises,
  a light detecting device 3, connectable to a processing unit 4, and arranged at a light detecting position of each of the light permeable tubes and configured to detect light emitted from a light emitting device 2 emitting light through each of the six light permeable tubes 1 and configured to transfer information comprising information relating to the detected light to the processing unit 4 to enable the processing unit to determine the bend of the light permeable tubes 1;
to obtain values of the intensities of detected light having propagated through a light permeable tube.

The method that enables a determination of the position or the orientation of the moving frame portion of the sensor subject to forces and/or torques comprises:
  obtaining S1 the values of detected light intensities for light having propagated through different light permeable tubes;
  converting S2 the values of the detected light intensities to a specific length values corresponding to particular distances between the moving frame portion and a frame portion fixed relative said moving frame portion;

determining S3 the position and/or the orientation of the moving frame portion relative the fixed frame portion based on the length values.

It should be noted that the method enables the determination of both the position and the orientation of the moving frame portion. The method may be used to first provide the positioning of the moving frame and then continue to provide the orientation of the moving frame relative the fixed frame by utilizing the determined position.

In the method above the moving frame portion may correspond to the first frame portion 11a of the described sensor and the frame portion fixed relative the moving frame portion may correspond to the frame portion 11b of the described sensor. The method therefor provides a way to determine the orientation of frame portion 11a relative frame portion 11b and, as a consequence, the orientation of the sensor comprising frame portion 11a and frame portion 11b. It will thereby be possible to determine an orientation of a flexible element that comprises the sensor.

The step S3 of determining the position and/or the orientation of the moving frame portion relative the fixed frame portion may in a particular embodiment be performed by means of a numerical kinematic method where the length values are used as input to the numerical kinematic method.

A numerical kinematic method is a well-known method and may also be referred to as a numerical Newton method that utilizes Lagrange multipliers. A direct outline of the method can be found in REF 7. A detailed description of how this method may be used in a particular example will be given below.

The conversion between the values of the detected light intensities and the specific length values is preferably performed by means of a look-up table. The content of the table containing pre-determined conversion factors whereby a particular detected intensity is mapped to a determined length value.

The table content can be obtained experimentally by performing measurements where the value of the distances between frame portions 11a and 11b are known and where the intensities are measured. In this way will it be possible to provide a direct mapping between detected intensities and corresponding distances.

The method is particularly useful for the case where the sensor comprises six light permeable tubes that extends between the frames of the flexible element, see any of FIGS. 7-9 for an illustration of sensor that can be used to perform the method.

This positioning method provides for a numerical kinematic method that can be used for a flexible element that is provided with six tubes that extends between the frames of the flexible element. Preferably the tubes will be fastened to the frames so that the fastening points lies in a common plane on each frame. The algorithm presented below displays robust convergence features if the fastening position of the tubes in the fixed frame correspond to the form of a hexagon and the fastening position of the tubes in the moving frame is provided in the form of a triangle, such as shown in FIG. 7.

Below we provide a more mathematical outline of the procedure, first define the following relations:

$$g_{1..15} = \|p_i - p_j\|^2 - h_{ij}, \quad i,j = 1, \ldots, 6 \quad i \neq j$$

$$g_{16} = ((p_3 - p_1) \times (p_5 - p_1)) \cdot (p_2 - p_1)$$

-continued $$g_{17} = ((p_3 - p_1) \times (p_5 - p_1)) \cdot (p_4 - p_1)$$

$$g_{18} = ((p_3 - p_1) \times (p_5 - p_1)) \cdot (p_6 - p_1)$$

$$g_{19} = ((p_4 - p_2) \times (p_6 - p_2)) \cdot (p_1 - p_2)$$

$$g_{20} = ((p_4 - p_2) \times (p_6 - p_2)) \cdot (p_3 - p_2)$$

$$g_{21} = ((p_4 - p_2) \times (p_6 - p_2)) \cdot (p_5 - p_2)$$

$$I_\lambda = \sum_{i=1}^{6} (l_i(I_i)^2 - \|p_i - b_i\|^2) + \sum_{i=1}^{21} \lambda_i g_i$$

These expressions can be used to determine the orientation of a flexible element by means of the following exemplary algorithm:

1. Set the values $h_{ij}$ to the squared distance between the points of fastening for tube i and tube j, in the frame to be positioned, that is the moving frame,
2. Set the vectors $b_i$ to the fastening positions of tube i for the fixed frame and the vectors $p_i$ to the positions where they were last located in relation to the center of the other frame.
3. Set $\eta$ to some value, for example 0.0001.
4. Set $\lambda_{1..21}$ to some value, for example 0.3.
5. Set k to 0.
6. Create $x_k$ as $x_k = [p_1, \ldots, p_6, \lambda_1, \ldots, \lambda_{21}]_k$
7. Find $I_i(I_i)$, i=1, \ldots, 6, in a calibration table for detected light intensities $I_i$, where i is the tube index.
8. Calculate $g_{1..21}$ with the values of $b_i$ and $p_i$ from $x_k$
9. Calculate $\nabla I_\lambda$
10. Create $x_{k+1}$ as $x_{k+1} = x_k - \eta \nabla I_\lambda$
11. Set k=k+1
12. If sufficient number of iterations (such as k=1000) has been run continue to step 13, otherwise continue from step 8
13. Calculate the position of the moving frame, T, in relation to the position of the fastened frame by using points $p_1$, $p_2$ and $p_3$ and known data about the fastening positions of the tubes in the moving frame in relation to the translation center of the moving frame
14. Find the orientation of the moving frame in relation to the fastened frame by using the positions $p_{1..6}$ by using geometric methods, such as the method by F. L. Markley that solves Whaba's problem. See, e.g. Markley, F. L. Attitude Determination using Vector Observations and the Singular Value Decomposition Journal of the Astronautical Sciences, 1988, 38, 245-258

The values $g_{16..21}$ creates rigidity constraints for the moving frame. These constraints looks different for each tube setup. The setup shown creates rigidity constraints for tubes fastening positions in the form of a triangle, where each pair of fastening positions at the edge of the triangle is at the exact same position. For setups having more tubes than six the limits for indices i and j has to be changed and the vector $x_k$ has to be expanded to hold all Lagrange multipliers $\lambda$ and the positions of all tube fastening positions in the moving frame. Also more constraints $g_i$ and squared distances $h_{ij}$ has to be added.

The proposed method can in particular embodiments be performed by means of a computer program. The computer program comprises instructions, which when executed by at least one processor, cause the processor(s) to:

read the values of detected light intensities for light having propagated through different light permeable tubes;

convert the values of the detected light intensities to specific length values corresponding to particular distances between the moving frame portion and a frame portion fixed relative said moving frame portion;

determine the position and/or the orientation of the moving frame portion relative the fixed frame portion based on the length values.

The computer program may in particular convert the values of the detected light intensities to specific length values by means of reading from a pre-determined table providing a mapping between detected light intensities and specific length values.

The computer program may also be provided with instructions that, when executed by at least one processor, cause the processor(s) to determine the orientation of the moving frame portion relative the fixed frame portion by using the length values as input in a numerical kinematic method.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The computer program residing in memory may also be organized as appropriate function modules configured to perform, when executed by the processor, at least part of the steps and/or tasks described herein.

Alternatively it is possibly to realize the modules predominantly by hardware modules, or alternatively by hardware. The extent of software versus hardware is purely implementation selection.

Having described various embodiments of the proposed sensor together with a method that can be used to provide the orientation of a flexible element, below follows further descriptions and examples of embodiments of the sensor. These embodiments and examples are merely intended to facilitate the understanding of the invention and should not be construed as limiting for the scope.

The light detecting device(s) 3, 33, 333 of every light permeable tube 1 may be provided somewhere along the length of the light permeable tube 1. In one embodiment it is provided on the second end 1*b* of the light permeable tube 1. By placing it there it is easy for an operator to reach it which makes it easier to replace the light detecting device if it is broken. In another embodiment is the light detecting position provided somewhere along the length of the tube closer to frame portion 11*b* than frame portion 11*a* in the case that the light emitting device(s) 2, 22, 222 is provided at frame portion 11*a*. In still another embodiment is the light detecting position provided in near proximity to the light emitting device. In this embodiment is the light permeable tube 1 provided with a mirror that reflects the emitted light that have propagated through the light permeable tube 1 back towards the light detecting device(s) 3, 33, 333. This might also be preferred for repair and replacement considerations. The mirror could in this case be provided at the second end 1*b* of the light permeable tube if the light emitting device(s) is provided at the first end 1*a* of the light permeable tube. The mirror could also be provided within the tubes at particular positions as described above in relation to the light detecting position. As can be seen is there a multitude of choices of where to position the light detecting device along the light permeable tubes. The common feature of all the possible positions is that they should be chosen so that the detected light has been able to propagate at least partially over the lengths of the light permeable tubes.

The sensor is in another exemplary embodiment provided with a processing unit that is connected to the light detecting device(s). In still another embodiment is the processing unit 4 integrated with the sensor. That is, it forms part of the sensor. The processing unit 4 is, as earlier, configured to determine the bend of each of the at least two tubes in the sensor based on characteristics of the detected light. The processing unit thus takes as input information comprising information regarding light characteristics such as intensity and based on the input it determines the bend of the sensor In one exemplary embodiment is the processing unit, in both the case where it is integrated in the sensor or externally provided but connectable to the sensor, also provided with a determining unit. The determining unit is configured to determine the length between two reference points along each of the at least two light permeable tubes based on the determined bend of each of the light permeable tubes. Here two reference points, Pa and Pb, on each of the tubes used in the sensor are chosen in advance. Based on the determined bend of the different tubes the determining unit is configured to determine the length between these points. With lengths is here intended the Euclidean distance or the straight line connecting the points. Stated slightly more briefly, the determining unit takes as input the measures of bends of the tubes and determine the lengths between the selected points Pa and Pb of each of the light permeable tubes used in the sensor. To achieve a simple algorithm for computations it is preferred if the point Pa are centrally located within light permeable tube 1, 10 and are arranged at a location where the end portion 1*a*, 10*a* of the light permeable tube approximately connects to the frame portion 11*a*. Correspondingly the point Pb should be chosen to be centrally located within the light permeable tube 1, 10 and located at a position along the tube that is approximately the position where the end portion 1*b*, 10*b* connects with the frame portion 11*b*. Other locations of the points Pa and Pb are however possible at the cost of computational complexity. The appendix provides an exemplary algorithm that can be used for this length determining step.

In still another exemplary embodiment of a sensor according to the proposed technology there is provided a processing unit that comprises a computing unit. The computing unit is configured to compute, based on the determined lengths for each of the at least two light permeable tubes, a resulting vector corresponding to a vector directed from the frame portion 11*a* to the frame portion 11*b*. This unit therefore generates a vector that extends between the frame portions 11*a* and 11*b*.

One particular embodiment of a sensor that enables the positioning of a flexible element such as a robotic limb comprises light permeable tubes whose inside of the light permeable tubes is prepared to reduce reflections within, and obtain an even absorption along, the light permeable tubes. This might be done to counter the fact that some levels of bend might result in intensity spikes due to mirroring effects along the inner surface(s) of the tube(s) or that the bend estimation is dependent on the direction of the bend as a result of an uneven absorption in the tube. By processing the inner surface of the tube, by for example coating the surface with a coating or sanding it, so that the walls mostly reflects diffuse light the mirroring effects can be reduced making the bend estimation more precise. Another possible way to reduce the direct reflectivity is to provide the inside surface of the tube with soot. It is preferred if the chosen measure to reduce direct reflection does not lead to light polarization changing effects. In several embodiments of the sensor, embodiments that will be described below, is it preferable if the polarization of light stays constant during interactions between the light and the material of the light permeable tubes. It might be also be an advantage for computational reasons if the inner surface of the tube is more or less homogeneous. If the processing is made in a way that utilizes coatings or other materials so that the inner surface becomes homogenous and isotropic it is also possible to make the bend estimation for any particular direction by using only information on the relationship between bend and intensity readings for a single chosen direction. One possible way to obtain the features according to above is to sand the inner surface of the light permeable tubes and/or coat it with a silver paint.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In this particular example, at least some of the steps, functions, procedures, modules and/or blocks described herein are implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

APPENDIX

Section 1

Below is given a slightly more mathematical exposure of the principle behind the proposed technology. To facilitate the understanding a particular example is provided that is intended to provide the reader with an understanding of the principles.

Figure 12:
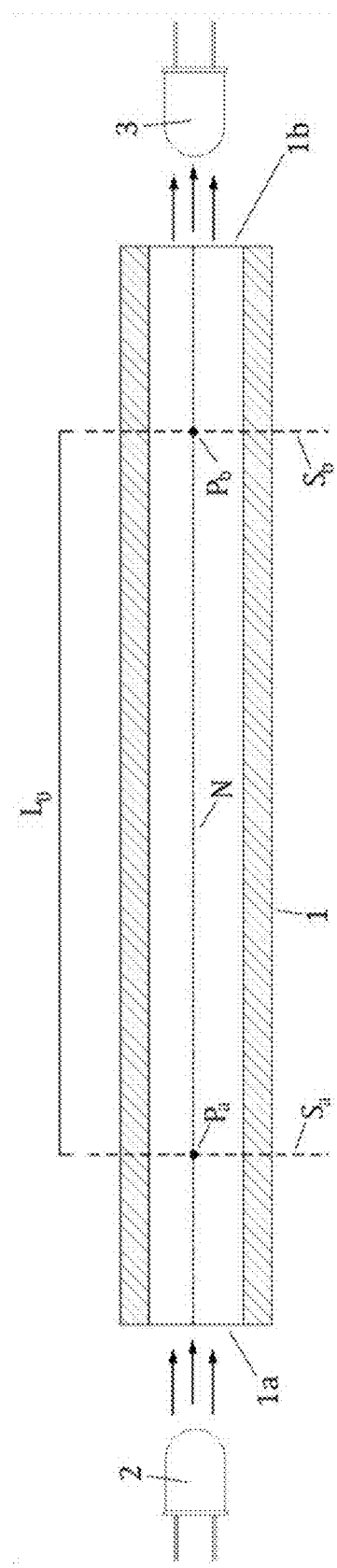
FIG. 12 is a schematic illustration of an embodiment of sensor according to the proposed technology.
Figure 13:
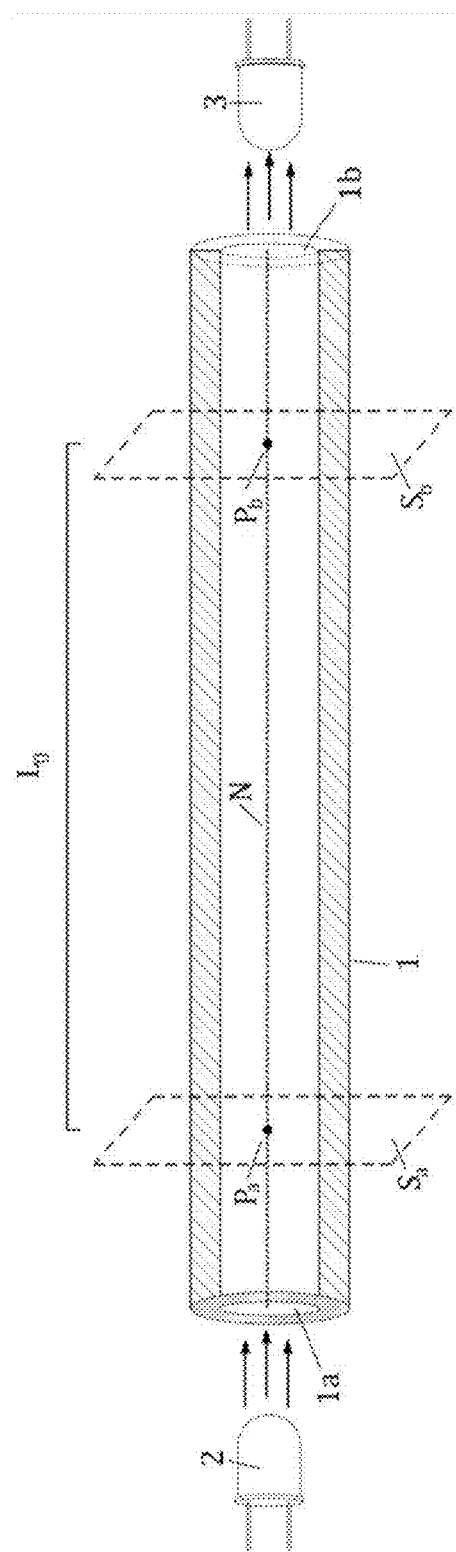
FIG. 13 is a schematic illustration of an embodiment of sensor according to the proposed technology.

In this example one light emitting source or device, henceforth called emitter, such as a LED, is arranged in a way that will allow it to emit light through a light permeable tube. A light detector, henceforth called detector, is in turn arranged in a way that allows it to detect the light intensity in the tube at some other position of the light permeable tube. Below this position is chosen at the opposite end of the light permeable tube from where the emitter is provided. Two reference points, $P_a$ and $P_b$, are located on the neutral axis N, see e.g. FIGS. 12, 13, or 15, of the tube at different positions where $P_a$ is closer to the emitter and $P_b$ is closer to the detector. Two planes, $S_a$ and $S_b$, is defined by the tangent of the tubes neutral axis in position $P_a$ and $P_b$ respectively. The intensity of the light shining through $S_a$ and $S_b$ in the orientation from the emitter to the detector is called $I_a$ and $I_b$. $I_a$ and $I_b$ can be described by the following relations:

$$I_a = \alpha_e I_e \quad \text{(eq. 1a)}$$

$$I_b = \alpha_t I_a \quad \text{(eq. 1b)}$$

$$I_d = \alpha_d I_b \quad \text{(eq. 1c)}$$

$I_e$ in the equations above is the intensity of the light released by the emitter and $I_d$ is the light intensity measured by the detector. The symbols $\alpha_e$, $\alpha_t$, and $\alpha_d$ is the light attenuation in the tube from the emitter to $S_a$, from $S_a$ to $S_b$ and from $S_b$ to the detector correspondingly. The attenuation from $S_a$ to $S_b$ is therefore given by equation 2.

$$\alpha_t = I_d / (\alpha_e \alpha_d I_e) \quad \text{(eq. 2)}$$

Other combinations of equation 1a-1c can derive $\alpha_t$, such as the relation below:

$$\alpha_t = I_b / I_a \quad \text{(eq. 3)}$$

The tube is processed, through coatings or other means, so that light shining through $S_a$ with intensity $I_a$ can be detected by a detector at position $P_b$ with the same intensity for a constant level of bend of the tube, between $S_a$ and $S_b$, from the tangent of the neutral axis in point $P_a$ or $P_b$, regardless of the direction of the bend relative to the tubes neutral axis. The relation between $\alpha_t$ and the bend of the tube between $S_a$ and $S_b$ is specific to the processing technique and material of the tube's inside and can be tested experimentally or derived analytically if enough material specifications is given.

Figure 15:
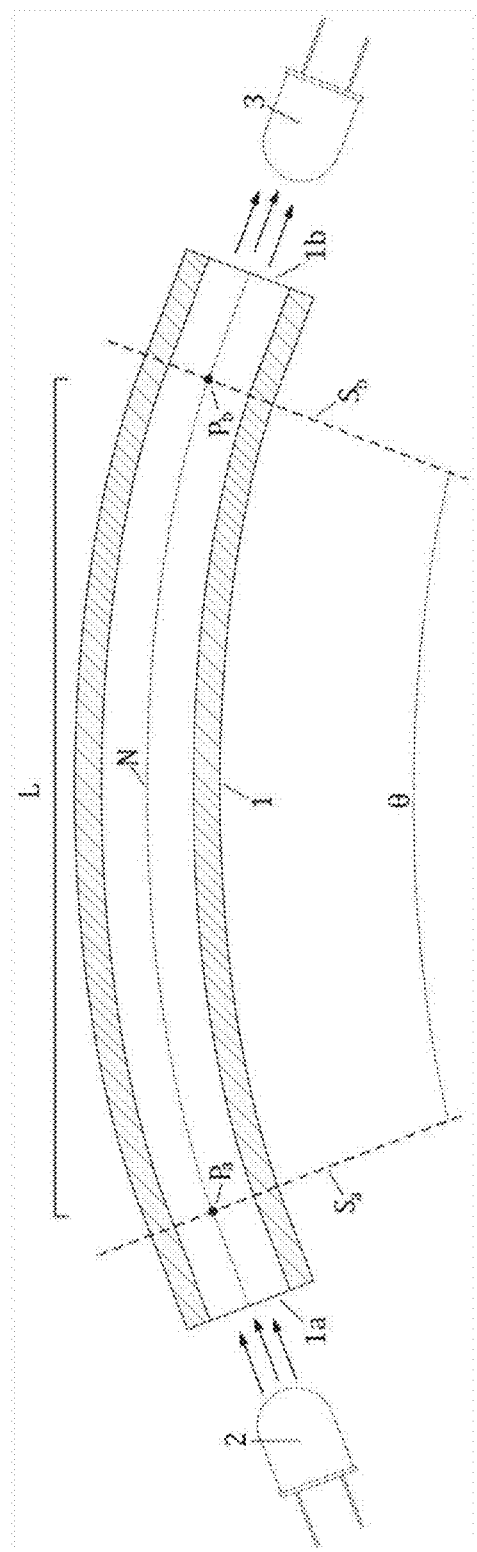
FIG. 15 is a schematic illustration of an embodiment of sensor according to the proposed technology.

The tube will attenuate light so that the curvature θ of the bend of the tube between $S_a$ and $S_b$, measured in radians, see FIG. 15, can be related to the attenuation $\alpha_t$ for predetermined values of the other attenuations and material specifications in the sensor. The curvature of the bend can be related to the absolute length L between $P_a$ and $P_b$. If a constant curvature assumption is used L can explicitly be given by equation 4 where $L_0$ indicates the length between $P_a$ and $P_b$ when the tube is not bent.

$$L = (2L_0/\theta)\sin(\theta/2) \qquad (4)$$

If no constant curvature assumption is used the relation between L and θ can be determined experimentally. θ can also be related to the magnitude of a resultant force acting on the tube, creating the bend, when the acting point is in either $S_a$ or $S_b$. The relation between θ and the forces magnitude can also be determined experimentally.

If both the emitter and the detector are linearly polarized and if the emitter can rotate around the neutral axis of the tube relative to the detector, the angle of rotation between the emitter and detector can be calculated. By Malus's law the intensity of light detected by the detector will be:

$$I_d = \alpha_e \alpha_t \alpha_d I_e \cos^2(\varphi),$$

where φ is the angle between the polarizing axis of the emitter and the polarizing axis of the detector and $I_e$ is the absolute intensity of the polarized light of the emitter. The angle φ is thus given by the relation:

$$\varphi = 0.5 \arccos\left(\frac{2I_D - 1}{\alpha_e \alpha_t \alpha_d I_e}\right)$$

To make the emitter linearly polarized a polarizing film can be placed between the emitter and detector statically aligning it with the emitter around the tube's neutral axis. By analogue, the detector can be made linearly polarized by putting a polarizing film between the emitter and detector statically aligning it with the detector around the tube's neutral axis.

Section 2

Below is given a more detailed description of exemplary algorithms for positioning of a flexible element, such as a robotic limb, based on the methods and sensors described earlier. These are exemplary algorithms that are given to enable the skilled artisan to utilize the sensors. Other specific mathematical algorithms are however foreseeable and as such they can also be implemented to provide for a representation of the position of a robotic limb.

2D Positioning Algorithm

Figure 14:
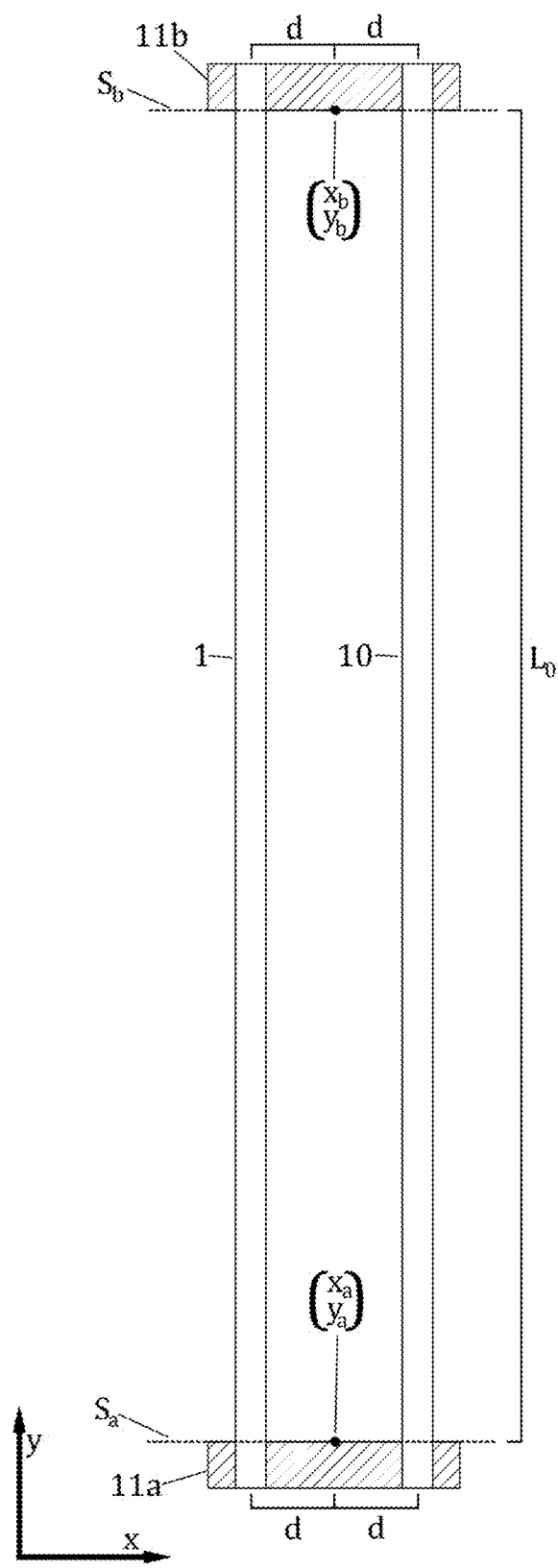
FIG. 14 is a schematic illustration of an embodiment of sensor according to the proposed technology.

The give the simplest possible setup the proposed method relates to a sensor that comprises two tubes of equal length whose ends are attached to two solid frames. The fastening points in each frame are at equal length d from each frame's center. It is assumed that the frame portion 11a is fixed in space with the frame lengthwise running parallel to the x axis, see FIG. 14. All bending motion will occur in the x-y plane by applying a force on the frame portion 11b. For this setup (see e.g. FIG. 15 for the bend of a single tube) the exemplary algorithm used for 2D positioning of a flexible element can be divided into the following steps:

1. Determine the distance d from the center of the frame to each tube's neutral axis intersecting the plane of the frame, and measure the tube's initial length $L_0$.
2. Activate the light emitting sources.
3. Determine the light intensity I for each level of bend θ for each tube.
4. Measure the light intensity I for each tube: $(I_1, I_2)$
5. Determine the level of bend θ for each tube from the intensities in step 3: $(\theta_1, \theta_2)$
6. Calculate the lengths $(l_1, l_2)$ from the bends in step 4 and the tube's initial length $L_0$ as:

$$l_i = \frac{2L_0}{\theta_i} \sin\left(\frac{\theta_i}{2}\right)$$

7. Create the tuple $q = (l_1, l_2, d)$ and calculate $$\kappa(q) = \frac{l_1 - l_2}{d(l_1 + l_2)}$$

$$l(q) = \frac{2d(l_1 + l_2)}{l_1 - l_2} \sin^{-1}\left(\frac{l_1^2 - l_2^2}{4d(l_1 + l_2)}\right)$$

$$\vec{r}(q) = \begin{pmatrix} \frac{1}{\kappa(q)}(1 - \cos(\kappa(q)l(q))) \\ \frac{1}{\kappa(q)} \sin(\kappa(q)l(q)) \end{pmatrix}$$

8. Calculate the vector from the reference point $$\begin{pmatrix} x_a \\ y_a \end{pmatrix}$$

of the frame portion 11a to the other as $$\begin{pmatrix} x_b \\ y_b \end{pmatrix} = \begin{pmatrix} x_a \\ y_a \end{pmatrix} + \vec{r}(q),$$

where $$\begin{pmatrix} x_a \\ y_a \end{pmatrix}$$

is the center of the bottom frame and $$\begin{pmatrix} x_b \\ y_b \end{pmatrix}$$

is the resultant vector from the origin to the reference point in the frame portion 11b.

To continually perform the 2D positioning steps 4-8 can be iterated after a first full run.

3D Positioning Algorithm

The simplest setup for 3D positioning utilizes a sensor that comprises three tubes of equal length whose ends are attached to two solid frames. The fastening points in each frame are at equal length from the frames center. The three fastening points are angularly fixed to be equal between the tubes and the frames center. The frame portion 11*a* will be considered fixed in space parallel to the x-y plane. All bending motion results from the application of a force on frame portion 11*b*. For this particular setup the algorithm used for 3D positioning of the flexible element can be divided into the following steps:

1. Determine the distance d from the center of the frame to each tube's center, in the plane of the frame, and measure the tube's initial length $L_0$.
2. Activate the light emitting sources.
3. Determine the light intensity I for each level of bend θ for each tube.
4. Measure the light intensity I for each tube: $(i_1, i_2, i_3)$
5. Determine the level of bend θ for each tube from the intensities in step 3: $(\theta_1, \theta_2, \theta_3)$
6. Calculate the lengths $(l_1, l_2, l_3)$ from the bends in step 4 and the tube's initial length $L_0$ as:

$$l_i = \frac{2L_0}{\theta_i}\sin\left(\frac{\theta_i}{2}\right)$$

7. Create the tuple $q=(l_1, l_2, l_3, d)$ and calculate $$\Phi(q) = \tan^{-1}\left(\frac{l_2 + l_3 - 2l_1}{\sqrt{3}(l_2 - l_3)}\right)$$

$$\kappa(q) = \frac{2\sqrt{l_1^2 + l_2^2 + l_3^2 - l_1l_2 - l_1l_3 - l_2l_3}}{d(l_1 + l_2 + l_3)}$$

$$l(q) = \frac{d(l_1 + l_2 + l_3)}{2\sqrt{l_1^2 + l_2^2 + l_3^2 - l_1l_2 - l_1l_3 - l_2l_3}}\sin^{-1}\left(\frac{\sqrt{l_1^2 + l_2^2 + l_3^2 - l_1l_2 - l_1l_3 - l_2l_3}}{3d}\right)$$

$$\vec{r}(q) = \begin{pmatrix} \frac{1}{\kappa(q)}(1 - \cos(\kappa(q)l(q)))\cos(\Phi(q)) \\ \frac{1}{\kappa(q)}(1 - \cos(\kappa(q)l(q)))\sin(\Phi(q)) \\ \frac{1}{\kappa(q)}\sin(\kappa(q)l(q)) \end{pmatrix}$$

8. Calculate the vector from the center of the first frame to the other as $$\begin{pmatrix} x_b \\ y_b \\ y_b \end{pmatrix} = \begin{pmatrix} x_a \\ y_a \\ z_a \end{pmatrix} + \vec{r}(q),$$

where $$\begin{pmatrix} x_a \\ y_a \\ z_a \end{pmatrix}$$

is the center of frame portion 11*a* and $$\begin{pmatrix} x_b \\ y_b \\ y_b \end{pmatrix}$$

is the resultant vector from the origin to the reference point in frame portion 11*b*.

To continually perform the 3D positioning steps 4-8 can be iterated after a first full run.

REFERENCES

Ref 1: K. Xu, N. Simaan, "An Investigation of the Intrinsic Force Sensing Capabilities of Continuum Robots", IEEE Transaction on Robotics, Vol 23, pp. 576-587

Ref : E. J. Lobaton, J. Fu, L. G. Torres, R. Alterovitz, "Continuous Shape Estimation of Continuum Robots Using X-ray Images"

Ref 3: J. M. Croom, D. C. Rucker, J. M. Romano, R. J. Webster III,"Visual Sensing of Continuum Robot Shape Using Self-Organizing Maps", IEEE International Conference on Robotics and Automation, 2010

Ref 4: G. Chen, M. T. Pham, T. Redarce, "Sensor-based guidance control of a continuum robot for a semi-autonomous colonoscopy", Robotics and Autonomus Systems, Vol 57, pp. 712-722

Ref 5: US2006045408A1, Jones et al

Ref 6: Kesner, Gavalis et al, "Multifiber optical bend sensor to aid colonoscope navigation", Optical Engineering 50(12), 124402, December 2011.

Ref 7: Cruz, Ferreira, Sequeirs: "Modelling two classes of Stewart-Gough platforms".

The invention claimed is:

1. A sensor for enabling positioning of a flexible element subject to applied forces, the sensor comprises:
    at least two spatially separated light permeable tubes (1, 10) each tube having a first end (1*a*, 10*a*) arranged on a first frame portion (11*a*) and a second end (1*b*, 10*b*) arranged on a second frame portion (11*b*) of the flexible element, wherein at least one of said first end (1*a*, 10*a*) or said second end (1*b*, 10*b*) of at least one light permeable tube (1, 10) are attached to a corresponding first frame portion (11*a*, 11*b*) by means of a joining means (120); and wherein each of said at least two spatially separated light permeable tubes further comprises,
    at least one light detecting device (3), connectable to a processing unit (4), and arranged at a light detecting position of a corresponding light permeable tube (1, 10) and configured to detect light emitted from at least one light emitting device (2) through the corresponding light permeable tube (1, 10) and configured to transfer information comprising information relating to the detected light to the processing unit (4) to enable the processing unit to determine the bend of the light permeable tubes (1, 10).

2. The sensor according to claim 1, wherein each end of at least one tube (1, 10) are attached to the corresponding frame portion (11a, 11b) by means of joining means (120).

3. The sensor according to claim 1, wherein said joining means (120) comprises a spherical bearing or a universal joint.

4. The sensor according to claim 3, wherein one end of at least one tube (1, 10) are attached by means of a spherical bearing and the other end of the at least one tube (1, 10) are attached by means of a universal joint.

5. The sensor according to claim 1, wherein said sensor further comprises a light emitting device (3) comprising a plurality of light emitting diodes, each light emitting diode being configured to emit light of a pre-determined wavelength.

6. The sensor according to claim 1, wherein said sensor further comprises at least one reference detector (30, 350, 355), said at least one reference detector being arranged in the vicinity of the light emitting device (2) and being configured to detect light emitted from the light emitting device before said light enters said light permeable tubes (1, 10) to obtain reference values for certain light characteristics of said emitted light.

7. The sensor according to claim 6, wherein the sensor also comprises a beam-splitter arranged between the light emitting device (3) and the light permeable tube, said beam-splitter being configured to direct part of the light emitted from the light emitting device (3) to the reference detector (30).

8. The sensor according to claim 1, wherein said sensor further comprises at least one diffusion filter (45, 450) arranged between the light emitting device (3) and the light permeable tube (1).

9. The sensor according to claim 1, wherein said sensor comprises six spatially separated light permeable tubes (1, 10).

10. The sensor according to claim 1, wherein the number of light detecting devices (3) and light emitting devices corresponds to the number of light permeable tubes and wherein each of said light detecting device (3) and said light emitting device (2) are used for a designated light permeable tube (1, 10).

11. The sensor according to claim 1, wherein said light emitting device (2) comprises a laser and wherein said light detecting device (3) comprises an array of light detecting devices (3).

12. A flexible element comprising a sensor according to claim 1.

13. The flexible element according to claim 12, wherein said flexible element further comprises a protective casing (65) enclosing parts of the flexible element.

14. The flexible element according to claim 13, wherein said protective casing comprises at least one segment (66) of an elastic material.

15. A method for determining the orientation of a moving frame portion of a flexible element by using a sensor according to claim 1, the method comprises the steps of:
    obtaining (S1) values of detected light intensities for light having propagated through different light permeable tubes; and
    converting (S2) the obtained values of the detected light intensities to corresponding length values representing particular distances between said moving frame portion and a second frame portion of said flexible element fixed relative said moving frame portion;
    determining (S3) the position and/or the orientation of the moving frame portion relative the fixed frame portion by utilizing the length values as input in a numerical direct kinematic method.

16. The sensor according to claim 2, wherein said joining means (120) comprises a spherical bearing or a universal joint.

17. The sensor according to claim 2, wherein said sensor further comprises a light emitting device (3) comprising a plurality of light emitting diodes, each light emitting diode being configured to emit light of a pre-determined wavelength.

18. The sensor according to claim 3, wherein said sensor further comprises a light emitting device (3) comprising a plurality of light emitting diodes, each light emitting diode being configured to emit light of a pre-determined wavelength.

19. The sensor according to claim 4, wherein said sensor further comprises a light emitting device (3) comprising a plurality of light emitting diodes, each light emitting diode being configured to emit light of a pre-determined wavelength.

20. The sensor according to claim 2, wherein said sensor further comprises at least one reference detector (30, 350, 355), said at least one reference detector being arranged in the vicinity of the light emitting device (2) and being configured to detect light emitted from the light emitting device before said light enters said light permeable tubes (1, 10) to obtain reference values for certain light characteristics of said emitted light.

* * * * *